United States Patent
Papakostas et al.

(10) Patent No.: US 10,965,765 B2
(45) Date of Patent: Mar. 30, 2021

(54) SYSTEMS, METHODS, AND APPARATUS TO MONITOR MOBILE INTERNET ACTIVITY

(71) Applicant: The Nielsen Company (US), LLC, New York, NY (US)

(72) Inventors: Achilleas Papakostas, Dallas, TX (US); Michael Andrew Yonker, Dallas, TX (US)

(73) Assignee: The Nielsen Company (US), LLC, New York, NY (US)

( * ) Notice: Subject to any disclaimer, the term of this patent is extended or adjusted under 35 U.S.C. 154(b) by 68 days.

(21) Appl. No.: 16/436,742

(22) Filed: Jun. 10, 2019

(65) Prior Publication Data
US 2019/0297156 A1 Sep. 26, 2019

Related U.S. Application Data

(63) Continuation of application No. 14/537,488, filed on Nov. 10, 2014, now Pat. No. 10,320,925, which is a
(Continued)

(51) Int. Cl.
*H04L 29/08* (2006.01)
*H04L 29/12* (2006.01)
(Continued)

(52) U.S. Cl.
CPC ........ *H04L 67/22* (2013.01); *H04L 29/12018* (2013.01); *H04L 29/12924* (2013.01);
(Continued)

(58) Field of Classification Search
CPC .............. H04L 67/22; H04L 29/12018; H04L 29/12924; H04L 61/10; H04L 61/6063;
(Continued)

(56) References Cited

U.S. PATENT DOCUMENTS

| 4,355,372 A | 10/1982 | Johnson et al. |
| RE31,951 E | 7/1985 | Johnson et al. |

(Continued)

FOREIGN PATENT DOCUMENTS

| AU | 2011211443 | 3/2012 |
| AU | 2011211444 | 3/2012 |

(Continued)

OTHER PUBLICATIONS

European Patent Office, Intention to Grant, issued in connection with European Patent Application No. 11006705.5-1218, dated Feb. 26, 2020, (58 pages).

(Continued)

*Primary Examiner* — Philip J Chea
*Assistant Examiner* — Robert B McAdams
(74) *Attorney, Agent, or Firm* — Hanley, Flight & Zimmerman, LLC

(57) ABSTRACT

Systems, methods, and apparatus to monitor mobile Internet activity are disclosed. An example system includes at least one processor, and memory including instructions, when executed, cause the at least one processor to in response to obtaining first panelist demographic information associated with a first panelist and second panelist demographic information associated with a second panelist, assign a first port of a proxy server to a first mobile device associated with the first panelist and a second port of the proxy server to a second mobile device associated with the second panelist, the first port different from the second port, transmit configuration information to the first mobile device to instruct the first mobile device to transmit requests for media including a first request to the first port, and in response to obtaining the first request at the first port, store an association between the first panelist demographic information and the media.

20 Claims, 8 Drawing Sheets

Related U.S. Application Data continuation of application No. 12/856,651, filed on Aug. 14, 2010, now Pat. No. 8,886,773.

(51) Int. Cl.
   *H04L 29/06* (2006.01)
   *H04W 12/06* (2009.01)
   *H04M 3/22* (2006.01)
   *G06Q 30/02* (2012.01)

(52) U.S. Cl.
   CPC .......... *H04L 61/10* (2013.01); *H04L 61/6063* (2013.01); *H04L 63/0815* (2013.01); *H04L 67/18* (2013.01); *H04M 3/2254* (2013.01); *H04W 12/06* (2013.01); *G06Q 30/02* (2013.01)

(58) Field of Classification Search
   CPC .. H04L 63/0815; H04L 67/18; H04M 3/2254; H04W 12/06
   See application file for complete search history.

(56) References Cited

U.S. PATENT DOCUMENTS

| | | |
|---|---|---|
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,497,185 A | 3/1996 | Dufresne et al. |
| 5,526,427 A | 6/1996 | Thomas et al. |
| 5,550,928 A | 8/1996 | Lu et al. |
| 5,557,686 A | 9/1996 | Brown et al. |
| 5,584,050 A | 12/1996 | Lyons |
| 5,594,934 A | 1/1997 | Lu et al. |
| 5,659,469 A | 8/1997 | Deaton et al. |
| 5,675,510 A | 10/1997 | Coffey et al. |
| 5,689,799 A | 11/1997 | Dougherty et al. |
| 5,710,887 A | 1/1998 | Chelliah et al. |
| 5,715,399 A | 2/1998 | Bezos |
| 5,732,218 A | 3/1998 | Bland et al. |
| 5,737,025 A | 4/1998 | Dougherty et al. |
| 5,737,026 A | 4/1998 | Lu et al. |
| 5,751,450 A | 5/1998 | Robinson |
| 5,771,307 A | 6/1998 | Lu et al. |
| 5,781,913 A | 7/1998 | Felsenstein et al. |
| 5,790,875 A | 8/1998 | Andersin et al. |
| 5,848,396 A | 12/1998 | Gerace |
| 5,850,249 A | 12/1998 | Massetti et al. |
| 5,862,325 A | 1/1999 | Reed et al. |
| 5,872,850 A | 2/1999 | Klein et al. |
| 5,887,140 A | 3/1999 | Itsumi et al. |
| 5,889,548 A | 3/1999 | Chan |
| 5,961,593 A | 10/1999 | Gabber et al. |
| 5,970,469 A | 10/1999 | Scroggie et al. |
| 5,991,735 A | 11/1999 | Gerace |
| 6,006,260 A | 12/1999 | Barrick, Jr. et al. |
| 6,026,367 A | 2/2000 | Hjelmvik |
| 6,026,368 A | 2/2000 | Brown et al. |
| 6,052,730 A | 4/2000 | Felciano et al. |
| 6,055,573 A | 4/2000 | Gardenswartz et al. |
| 6,058,381 A | 5/2000 | Nelson |
| 6,070,145 A | 5/2000 | Pinsley et al. |
| 6,070,148 A | 5/2000 | Mori et al. |
| 6,081,900 A | 6/2000 | Subramaniam et al. |
| 6,115,680 A | 9/2000 | Coffee et al. |
| 6,128,624 A | 10/2000 | Papierniak et al. |
| 6,138,162 A | 10/2000 | Pistriotto et al. |
| 6,138,165 A | 10/2000 | Nakatsugawa |
| 6,141,686 A | 10/2000 | Jackowski et al. |
| 6,151,593 A | 11/2000 | Cho et al. |
| 6,286,043 B1 | 9/2001 | Cuomo et al. |
| 6,286,046 B1 | 9/2001 | Bryant |
| 6,321,336 B1 | 11/2001 | Applegate et al. |
| 6,351,467 B1 | 2/2002 | Dillon |
| 6,381,632 B1 | 4/2002 | Lowell |
| 6,421,733 B1 | 7/2002 | Tso et al. |
| 6,449,251 B1 | 9/2002 | Awadallah et al. |
| 6,487,538 B1 | 11/2002 | Gupta et al. |
| 6,507,589 B1 | 1/2003 | Ramasubmmani et al. |
| 6,567,857 B1 | 5/2003 | Gupta et al. |
| 6,606,581 B1 | 8/2003 | Nickerson et al. |
| 6,658,414 B2 | 12/2003 | Bryan et al. |
| 6,704,787 B1 | 3/2004 | Umbreit |
| 6,839,680 B1 | 1/2005 | Liu et al. |
| 6,856,963 B1 | 2/2005 | Hurwitz |
| 6,865,613 B1 | 3/2005 | Millet et al. |
| 6,993,590 B1 | 1/2006 | Gauthier et al. |
| 7,003,555 B1 | 2/2006 | Jungck |
| 7,039,599 B2 | 5/2006 | Merriman et al. |
| 7,065,505 B2 | 6/2006 | Stefik et al. |
| 7,080,077 B2 | 7/2006 | Ramamurthy et al. |
| 7,092,926 B2 | 8/2006 | Cerrato |
| 7,092,942 B2 | 8/2006 | Frieden et al. |
| 7,159,023 B2 | 1/2007 | Tufts |
| 7,181,412 B1 | 2/2007 | Fulgoni et al. |
| 7,200,632 B1 | 4/2007 | Greschler et al. |
| 7,216,149 B1 | 5/2007 | Briscoe et al. |
| 7,260,837 B2 | 8/2007 | Abraham et al. |
| 7,277,915 B2 | 10/2007 | De Boor et al. |
| 7,366,724 B2 | 4/2008 | Frieden et al. |
| 7,375,641 B2 | 5/2008 | Kiel et al. |
| 7,376,722 B1 | 5/2008 | Sim et al. |
| 7,526,538 B2 | 4/2009 | Wilson |
| 7,584,423 B2 | 9/2009 | Rohrabaugh et al. |
| 7,606,897 B2 | 10/2009 | Izrailevsky et al. |
| 7,609,711 B2 | 10/2009 | Kyung et al. |
| 7,613,809 B2 | 11/2009 | Jackson et al. |
| 7,688,813 B2 | 3/2010 | Shin et al. |
| 7,695,879 B2 | 4/2010 | Vanbesien et al. |
| 7,814,483 B2 | 10/2010 | Li et al. |
| 7,849,502 B1 | 12/2010 | Bloch et al. |
| 7,925,515 B2 | 4/2011 | Xu et al. |
| 8,086,219 B2 | 12/2011 | O'Neil et al. |
| 8,285,218 B2 | 10/2012 | Papakostas et al. |
| 8,307,006 B2 | 11/2012 | Hannan et al. |
| 8,340,711 B1 | 12/2012 | Glass et al. |
| 8,483,765 B2 | 7/2013 | Cho |
| 8,594,617 B2 | 11/2013 | Papakostas et al. |
| 8,635,129 B2 | 1/2014 | Story et al. |
| 8,649,292 B2 | 2/2014 | Zheng |
| 8,755,511 B2 | 6/2014 | Duva et al. |
| 8,775,571 B2 | 7/2014 | Srinivasan |
| 8,886,773 B2 | 11/2014 | Papakostas et al. |
| 8,910,259 B2 | 12/2014 | Papakostas et al. |
| 9,301,173 B2 | 3/2016 | Papakostas |
| 9,307,418 B2 | 4/2016 | Papakostas et al. |
| 9,736,136 B2 | 8/2017 | Papakostas et al. |
| 9,762,688 B2 | 9/2017 | Papakostas et al. |
| 10,257,297 B2 | 4/2019 | Papakostas et al. |
| 10,320,925 B2 | 6/2019 | Papakostas et al. |
| 10,356,579 B2 | 7/2019 | Papakostas et al. |
| 2001/0014915 A1 | 8/2001 | Blumenau |
| 2001/0020242 A1 | 9/2001 | Gupta et al. |
| 2002/0069368 A1 | 6/2002 | Hines |
| 2002/0077903 A1 | 6/2002 | Feldman et al. |
| 2002/0116523 A1 | 8/2002 | Warrier et al. |
| 2002/0128803 A1 | 9/2002 | Skinner et al. |
| 2002/0144156 A1 | 10/2002 | Copeland, III |
| 2002/0165928 A1 | 11/2002 | Landfeldt et al. |
| 2002/0169830 A1 | 11/2002 | Mild et al. |
| 2002/0178257 A1 | 11/2002 | Cerrato |
| 2003/0009762 A1 | 1/2003 | Hooper et al. |
| 2003/0018778 A1 | 1/2003 | Martin et al. |
| 2003/0033432 A1 | 2/2003 | Simpson et al. |
| 2003/0035409 A1 | 2/2003 | Wang et al. |
| 2003/0051052 A1 | 3/2003 | Shteyn et al. |
| 2003/0065595 A1 | 4/2003 | Anglum |
| 2003/0076305 A1 | 4/2003 | Allen |
| 2003/0091025 A1 | 5/2003 | Celi, Jr. et al. |
| 2003/0154306 A1 | 8/2003 | Perry |

(56) References Cited

U.S. PATENT DOCUMENTS

| | | |
|---|---|---|
| 2003/0195884 A1 | 10/2003 | Boyd et al. |
| 2004/0133687 A1 | 7/2004 | Yamaguchi et al. |
| 2004/0205159 A1 | 10/2004 | Johnson et al. |
| 2005/0021603 A1 | 1/2005 | Yokomitsu et al. |
| 2005/0108539 A1 | 5/2005 | Skog et al. |
| 2005/0138192 A1 | 6/2005 | Encarnacion et al. |
| 2005/0198261 A1 | 9/2005 | Durvasula et al. |
| 2005/0201357 A1 | 9/2005 | Poyhonen |
| 2006/0133332 A1 | 6/2006 | Achanta |
| 2006/0258341 A1 | 11/2006 | Miller et al. |
| 2006/0264202 A1 | 11/2006 | Hagmeier et al. |
| 2006/0274774 A1 | 12/2006 | Srinivasan et al. |
| 2007/0073625 A1 | 3/2007 | Shelton |
| 2007/0089110 A1 | 4/2007 | Li |
| 2007/0123760 A1 | 5/2007 | Scholler et al. |
| 2007/0214501 A1 | 9/2007 | Muramoto et al. |
| 2007/0222598 A1 | 9/2007 | Kiel et al. |
| 2007/0274211 A1 | 11/2007 | Tsubota |
| 2008/0005736 A1 | 1/2008 | Apacible et al. |
| 2008/0056261 A1 | 3/2008 | Osborn et al. |
| 2008/0126420 A1 | 5/2008 | Wright et al. |
| 2008/0289010 A1 | 11/2008 | Frieden et al. |
| 2009/0034536 A1 | 2/2009 | Morand et al. |
| 2009/0036108 A1 | 2/2009 | Cho |
| 2009/0089356 A1 | 4/2009 | Murray et al. |
| 2009/0106035 A1 | 4/2009 | Xu et al. |
| 2009/0233633 A1 | 9/2009 | Morrison |
| 2009/0282471 A1 | 11/2009 | Green et al. |
| 2009/0285118 A1 | 11/2009 | Yoshikawa et al. |
| 2009/0296917 A1 | 12/2009 | Nogawa |
| 2009/0320123 A1 | 12/2009 | Yu et al. |
| 2010/0036969 A1 | 2/2010 | Perry et al. |
| 2010/0095215 A1 | 4/2010 | Elven |
| 2010/0191947 A1 | 7/2010 | Shin |
| 2010/0205029 A1 | 8/2010 | Asherman et al. |
| 2010/0205617 A1 | 8/2010 | Hogan et al. |
| 2010/0216434 A1 | 8/2010 | Marcellino et al. |
| 2010/0238837 A1 | 9/2010 | Zheng |
| 2010/0293610 A1 | 11/2010 | Beachem et al. |
| 2011/0029988 A1 | 2/2011 | Mittal et al. |
| 2011/0047254 A1 | 2/2011 | Vainionpaa et al. |
| 2011/0252430 A1 | 10/2011 | Chapman et al. |
| 2011/0296416 A1 | 12/2011 | Kim et al. |
| 2012/0007932 A1 | 1/2012 | Yokoyama et al. |
| 2012/0042005 A1 | 2/2012 | Papakostas et al. |
| 2012/0042367 A1 | 2/2012 | Papakostas et al. |
| 2012/0158908 A1 | 6/2012 | Luna et al. |
| 2012/0210321 A1 | 8/2012 | Silva et al. |
| 2012/0216063 A1 | 8/2012 | Ogata |
| 2012/0235930 A1 | 9/2012 | Lazaridis et al. |
| 2012/0271719 A1 | 10/2012 | Straley et al. |
| 2012/0295581 A1 | 11/2012 | Agarwal |
| 2013/0005296 A1 | 1/2013 | Papakostas et al. |
| 2013/0006708 A1 | 1/2013 | Lee |
| 2013/0031599 A1 | 1/2013 | Luna et al. |
| 2013/0035059 A1 | 2/2013 | Liu et al. |
| 2013/0054402 A1 | 2/2013 | Asherman et al. |
| 2013/0064109 A1 | 3/2013 | Combet et al. |
| 2013/0066875 A1 | 3/2013 | Combet et al. |
| 2013/0183926 A1 | 7/2013 | Lindberg et al. |
| 2013/0276129 A1 | 10/2013 | Nelson et al. |
| 2013/0281050 A1 | 10/2013 | Agarwal et al. |
| 2014/0036687 A1 | 2/2014 | Papakostas et al. |
| 2014/0273923 A1 | 9/2014 | Papakostas |
| 2014/0280896 A1 | 9/2014 | Papakostas et al. |
| 2015/0007256 A1 | 1/2015 | Kirkeby |
| 2015/0058958 A1 | 2/2015 | Papakostas et al. |
| 2015/0067162 A1 | 3/2015 | Papakostas et al. |
| 2015/0088890 A1 | 3/2015 | Hoffert et al. |
| 2016/0127488 A1 | 5/2016 | Papakostas et al. |
| 2016/0232538 A1 | 8/2016 | Papakostas et al. |
| 2017/0374169 A1 | 12/2017 | Papakostas et al. |

FOREIGN PATENT DOCUMENTS

| | | |
|---|---|---|
| AU | 2012203829 | 1/2013 |
| AU | 2014210640 | 8/2014 |
| CA | 2748997 | 2/2012 |
| CA | 2749013 | 2/2012 |
| CA | 2781018 | 12/2012 |
| CA | 2749013 | 9/2020 |
| CN | 1909739 | 2/2007 |
| CN | 101594443 | 12/2009 |
| CN | 101605030 | 12/2009 |
| CN | 102377616 | 3/2012 |
| CN | 102377617 | 3/2012 |
| CN | 102917003 | 2/2013 |
| CN | 104219108 | 12/2014 |
| CN | 105025081 | 11/2015 |
| EP | 1980950 | 10/2008 |
| EP | 2079256 | 7/2009 |
| EP | 2341437 | 7/2011 |
| EP | 2418820 | 2/2012 |
| EP | 2418826 | 2/2012 |
| EP | 2549713 | 1/2013 |
| EP | 2418826 B1 | 10/2020 |
| GB | 2437842 | 11/2007 |
| HK | 1205386 | 1/2020 |
| JP | 2003219467 | 7/2003 |
| JP | 2004342080 | 12/2004 |
| JP | 2005115473 | 4/2005 |
| JP | 2007200209 | 8/2007 |
| JP | 2008511229 | 4/2008 |
| JP | 2009514050 | 4/2009 |
| JP | 2010079831 | 4/2010 |
| JP | 2012053870 | 3/2012 |
| JP | 2012053871 | 3/2012 |
| JP | 2013016169 | 1/2013 |
| JP | 5404714 | 11/2013 |
| KR | 2005008068 | 10/2005 |
| WO | 96/41495 | 12/1996 |
| WO | 98/31155 | 7/1998 |
| WO | 00/55783 | 9/2000 |
| WO | 01/11506 | 2/2001 |
| WO | 01/44975 | 6/2001 |
| WO | 01/52462 | 7/2001 |
| WO | 02/50694 | 6/2002 |
| WO | 03/67376 | 8/2003 |
| WO | 2006044820 | 4/2006 |
| WO | 2007123760 | 11/2007 |
| WO | 2014143969 | 9/2014 |

OTHER PUBLICATIONS

European Patent Office, Decision to Grant, issued in connection with European Patent Application No. 11006705.5-1218, dated Sep. 9, 2020, (2 pages).

Canadian Intellectual Property Office, "Notice of Allowance," issued in connection with application No. 2,749,013, dated Sep. 9, 2020, (1 page).

United States Patent and Trademark Office, "Final Office Action", issued in connection with U.S. Appl. No. 14/928,741, dated May 6, 2020, (11 pages).

United States Patent and Trademark Office, "Non-Final Office Action", issued in connection with U.S. Appl. No. 14/928,741, dated Sep. 20, 2019 (14 pages).

United States Patent and Trademark Office, "Advisory Action", issued in connection with U.S. Appl. No. 14/928,741, dated Aug. 18, 2020 (3 pages).

The State Intellectual Property Office of China, "Office Action" issued in corresponding application No. 201110294045.0, dated Sep. 26, 2013 (26 pages, English translation included).

The State Intellectual Property Office of China, "Office Action" issued in corresponding application No. 201110305485.1, dated Sep. 22, 2013 (22 pages, English translation included).

United States Patent and Trademark Office, "Final Office Action", issued in connection with U.S. Appl. No. 12/856,651, dated Aug. 28, 2013 (16 pages).

(56) References Cited

OTHER PUBLICATIONS

Dossick, S.E. et al., "WWW access to legacy client/server applications," Fifth International World Wide Web Conference, May 6-10, 1996, Paris, FR, http://iw3c2.cs.ust.hk/WWW5/www5conf.inria.fr/fich_html/papers/P4/Overview.html, (12 pages).

Zenel, B., et al., "A general Purpose Proxy Filtering Mechanism Applied to the Mobile Environment," Wireless Networks, ACM, US, vol. 5, No. 5, Oct. 1999 (Oct. 1999), XP000902494, (9 pages).

Diffie W. et al., "Privacy and Authentication: An introduction to Cryptography" Proceedings of the IEEE, IEEE. New York, US, vol. 67, No. 3, Mar. 1979 (Mar. 1979), pp. 397-426, SP000575227, (32 pages).

Srivastava, J., et al. "Web Usage Mining: Discovery and Applications of Usage Patterns from Web Data" ACM SIGKDD Explorations Newsletter, vol. 1, Issue 2, pp. 12-23, Jan. 2000, (12 pages).

Boyan, J. "The Anonymizer—Protecting User Privacy on the Web," Computer-Mediated Communication Magazine, Online! 1997, XP002231197, http://www.december.com/cmc/mag/1997/sep/toc.html, Sep. 1997, (6 pages).

Choo, C. et al. "A Behavioral Model of Information Seeking on the Web—Preliminary Results of a Study of How Managers and IT Specialists Use the Web," Oct. 25, 1998, (16 pages).

European Patent Office, "European Search Report", issued in connection with Application No. 11006705.5-2413, dated Oct. 14, 2011, (7 pages).

European Patent Office, "Partial European Search Report", issued in connection with Application No. 11006706.5-2413, dated Oct. 25, 2011, (7 pages).

Wavecrest Computing, "Cyfin Proxy User Manual for Version 8.2.x", XP55009573, URL:http://downloads.wavecrest.net/release/cyfin/manuals/v820/cyfinProxyManual.pdf, Apr. 9, 2010, (27 pages).

"User Identification and Authentication Vital Security 9.2", XP55009307, http://www.m86security.com/software/secure_web_gateway/manuals.9.2.0/User_Identification_and_Authentication.pdf, Apr. 25, 2010, (27 pages).

"HTTP Proxy Authentication and iPhone Apps", XP55009373, https://discussions.apple.com/message/8018666#8018666, Jan. 15, 2009, (4 pages).

United States Patent and Trademark Office, "Office Action", issued in connection with U.S. Appl. No. 12/856,651, dated Mar. 27, 2012, (12 pages).

European Patent Office, "Extended European Search Report and European Search Opinion", issued in connection with European Patent Application No. 11006706.5-2413, dated Apr. 5, 2012, (15 pages).

Japanese Patent Office, "Notice of Reasons for Rejection", issued in Patent application No. P2011-177687, dated Aug. 21, 2012 (3 pages, English translation included).

United States Patent and Trademark Office, "Office Action", issued in connection with U.S. Appl. No. 12/856,643, dated Jun. 18, 2012, (9 pages).

Japanese Patent Office, "Notice of Reasons for Rejection", issued in Patent application No. P2011-177690, dated Aug. 21, 2012 (4 pages, English translation included).

European Patent Office, "Partial European Search Report and European Search Opinion", issued in connection with European Patent Application No. 12004911.9-2413, dated Dec. 13, 2012, (8 pages).

European Patent Office, "Extended European Search Report", issued in connection with EP patent application No. 12004911.9-1856/2549713, dated Apr. 3, 2013 (11 pages).

IP Australia, "Patent Examination Report No. 1", issued in connection with AU patent application 2011211443, dated Apr. 2, 2013, (3 pages).

IP Australia, "Patent Examination Report No. 1", issued in connection with AU patent application 2011211444, dated Apr. 2, 2013, (3 pages).

Japan Patent Office, "Notice of Reasons for Rejection", issued in connection with JP patent application No. P2012-145685, dated May 7, 2013 (4 pages, English translation included).

IP Australia, "Patent Examination Report No. 1", issued in connection with AU patent application No. 2012203829, dated May 21, 2013 (3 pages).

Japanese Patent Office, "Notice of Reasons for Rejection", issued in Patent application No. P2011-177690, dated Jun. 25, 2013 (4 pages, English translation included).

United States Patent and Trademark Office, "Final Office Action", issued in connection with U.S. Appl. No. 12/856,643, dated May 9, 2013, (10 pages).

State Intellectual Property Office of China, "Notice of Allowance" in application No. 201110294045.0, dated Jul. 4, 2014 (5 pages, English translation included).

IP Australia, "Notice of Acceptance", issued in connection with AU patent application 2012203829, dated Jun. 12, 2014, (2 pages).

United States Patent and Trademark Office, "Notice of Allowance", issued in connection with U.S. Appl. No. 12/856,643, dated Aug. 5, 2014, (5 pages).

Canadian Patent Office, "Office Action" issued in connection with Canadian Patent Application No. 2,748,997, dated Nov. 21, 2013 (2 pages).

Canadian Patent Office, "Office Action" issued in connection with Canadian Patent Application No. 2,749,013, dated Sep. 10, 2013 (2 pages).

Canadian Patent Office, "Office Action" issued in connection with Canadian Patent Application No. 2,781,018, dated Apr. 7, 2014 (3 pages).

The State Intellectual Property Office of China, "Office Action" issued in connection with application No. 201110294045.0, dated Apr. 3, 2014 (5 pages, English translation included).

United States Patent and Trademark Office, "Non-Final Office Action", issued in connection with U.S. Appl. No. 13/840,594, dated Sep. 19, 2014 (12 pages).

United States Patent and Trademark Office, "Notice of Allowance", issued in connection with U.S. Appl. No. 12/856,643, dated Apr. 10, 2014, (14 pages).

United States Patent and Trademark Office, "Notice of Allowance", issued in connection with U.S. Appl. No. 13/174,517, dated Aug. 22, 2013, (19 pages).

United States Patent and Trademark Office, "Notice of Allowance", issued in connection with U.S. Appl. No. 13/174,517, dated Oct. 25, 2013, (6 pages).

United States Patent and Trademark Office, "Notice of Allowance", issued in connection with U.S. Appl. No. 13/174,517, dated Sep. 25, 2013, (6 pages).

United States Patent and Trademark Office, "Office Action", issued in connection with U.S. Appl. No. 13/174,517, dated Aug. 15, 2012, (13 pages).

United States Patent and Trademark Office, "Advisory Action", issued in connection with U.S. Appl. No. 12/856,651 dated Nov. 22, 2013 (3 pages).

United States Patent and Trademark Office,"Notice of Allowance", issued in connection with U.S. Appl. No. 12/856,651 dated Jul. 7, 2014 (11 pages).

International Searching Authority, "International Search Report and Written Opinion", issued in connection with International Application No. PCT/US2014/028176, dated Sep. 1, 2014 (11 pages).

United States Patent and Trademark Office, "Final Office Action", issued in connection with U.S. Appl. No. 13/840,543, dated Jan. 20, 2016, 18 pages.

Patent Cooperation Treaty, "International Preliminary Report on Patentability," issued in connection with Application No. PCT/US2014/028176, dated Sep. 15, 2015, 7 pages.

United States Patent and Trademark Office, "Notice of Allowance", issued in connection with U.S. Appl. No. 13/840,594, dated May 26, 2015, (8 pages).

United States Patent and Trademark Office, "Office Action", issued in connection with U.S. Appl. No. 13/840,594, dated Mar. 11, 2015, (17 pages).

State Intellectual Property Office of China, "Notice of Allowance," issued in connection with Application No. 201210296506.2, dated Mar. 18, 2015, 5 pages.

(56) References Cited

OTHER PUBLICATIONS

Canadian Intellectual Property Office, "Notice of Allowance", issued in connection with Canadian Patent Application No. 2,781,018, dated Apr. 16, 2015, 1 page.
Canadian Intellectual Property Office, "Notice of Allowance", issued in connection with Canadian Patent Application No. 2,748,997, dated Mar. 16, 2015, 1 page.
IP Australia, "Patent Examination Report No. 1," issued in connection with Application No. 2014210640, dated May 27, 2015, 4 pages.
United States Patent and Trademark Office, "Office Action", issued in connection with U.S. Appl. No. 13/840,543, dated May 21, 2015, (27 pages).
The State Intellectual Property Office of China, "First Office Action", issued in connection with Chinese Patent Application No. 201210296506.2, dated Sep. 2, 2014 (21 pages).
Japanese Patent Office, "Notice of Reasons for Rejection", issued in connection with Japanese Patent Application No. P2011-177687, dated Jun. 4, 2013 (7 pages).
IP Australia, "Notice of Grant", issued in connection with Australian Patent Application No. 2014210640, dated Oct. 20, 2016 (1 page).
Canadian Intelluctual Property Office, "Notice of Allowance", issued in connection with Canadian Patent Application No. 2,749,013, dated Nov. 4, 2014 (1 page).
European Patent Office, "Examination Report", issued in connection with European Patent Application No. 11006705.5, dated Mar. 21, 2016, (7 pages).
IP Australia, "Notice of Acceptance", issued in connection with AU Patent Application No. 2011211444, dated Apr. 29, 2014, (2 pages).
IP Australia, "Notice of Acceptance", issued in connection with AU Patent Application No. 2014210640, dated May 2, 2016, (2 pages).
IP Australia, "Patent Examination Report No. 1", issued in connection with AU Patent Application No. 2014210640, dated May 27, 2015, (4 pages).
Canadian Patent Office, "Office Action", issued in connection with Canadian Patent Application No. 2,749,013, dated Oct. 6, 2015, (4 pages).
Japanese Patent Office, "Notice of Reasons for Rejection", issued in connection with Japanese Patent Application No. P2011-177687, dated Jun. 4, 2013, (4 pages).
European Patent Office, "Communication Pursuant to Article 94(3) EPC", issued in connection with Application No. 11006706.3, dated Mar. 21, 2016, (9 pages).
Canadian Patent Office, "Office Action" issued in connection with Canadian Patent Application No. 2,748,997, dated Nov. 24, 2015 (5 pages).
European Patent Office, "Communication under Rule 71(3) EPC", issued in connection with European Patent Application No. 12004911.9, dated Feb. 2, 2016, (74 pages).
IP Australia, "Notice of Grant", issued in connection with AU patent application 2011211444, dated Aug. 21, 2014, (2 pages).
IP Australia, "Notice of Grant", issued in connection with Australian Application No. 2012203829, dated Oct. 9, 2014 (2 pages).
United States Patent and Trademark Office, "Non-Final Office Action", issued in connection with U.S. Appl. No. 14/041,613, dated Aug. 6, 2015, (10 pages).
United States Patent and Trademark Office, "Notice of Allowance", issued in connection with U.S. Appl. No. 14/041,613, dated Nov. 25, 2015, (9 pages).
United States Patent and Trademark Office, "Pre-Brief Appeal Conference Decision", issued in connection with U.S. Appl. No. 12/856,651, filed Jan. 13, 2014, (2 pages).
United States Patent and Trademark Office, "Non-Final Office Action", issued in connection with U.S. Appl. No. 14/529,784, dated Aug. 5, 2016, (8 pages).
United States Patent and Trademark Office, "Non-Final Office Action", issued in connection with U.S. Appl. No. 14/537,484, dated Jul. 12, 2016, (6 pages).
United States Patent and Trademark Office, "Non-Final Office Action", issued in connection with U.S. Appl. No. 13/840,543, dated Jan. 26, 2017, 17 pages.
United Stales Patent and Trademark Office, "Final Office Action", issued in connection with U.S. Appl. No. 14/529,784, dated Jan. 26, 2017, 8 pages.
United States Patent and Trademark Office, "Final Office Action", issued in connection with U.S. Appl. No. 14/537,484, dated Jan. 27, 2017, 8 pages.
The State Intellectual Property Office of China, "1st Office Action," issued in connection with application No. 201410432742.1 dated Mar. 29, 2017, 16 pages.
United States Patent and Trademark Office, "Notice of Allowance", issued in connection with U.S. Appl. No. 14/537,484, dated Apr. 13, 2017, 5 pages.
United States Patent and Trademark Office, "Notice of Allowance", issued in connection with U.S. Appl. No. 14/529,784, dated Apr. 26, 2017, 8 pages.
Intellectual Property India, "1st Examination Report," issued in connection with application No. 2320/DEL/2011, dated Aug. 29, 2017, 5 pages.
Canadian Intellectual Property Office, "Office Action," issued in connection with application No. 2,749,013, dated Jul. 24, 2017, 3 pages.
European Patent Office, "Communication pursuant to Article 94(3)", issued in connection with European Patent Application No. 11006705.5, dated Nov. 6, 2017, (4 pages).
The State Intellectual Property Office of China, "Second Notification of Office Action", issued in connection with Chinese Patent Application No. 201410432742.1, dated Nov. 16, 2017, (15 pages).
United States Patent and Trademark Office, "Non-Final Office Action," issued in connection with U.S. Appl. No. 13/840,543, dated Nov. 17, 2017, 26 pages.
The State Intellectual Property Office of China, "3rd Notification of Office Action", issued in connection with Chinese Patent Application No. 2014103432742.1, dated Apr. 23, 2018, (7 pages).
Intellectual Property Office of Canada, "Office Action," Issued in connection with application No. 2,749,013, dated Jun. 4, 2018, (4 pages).
United States Patent and Trademark Office, "Non-Final Office Action," issued in connection with U.S. Appl. No. 15/700,883, dated Aug. 14, 2018, 16 pages.
European Patent Office, "Examination Report," issued in connection with application No. 11006705.5, dated Aug. 24, 2018, 5 pages.
China National Intellectual Property Administration, "Notice of Allowance", issued in connection with Chinese Patent Application No. 2014103432742.1, dated Oct. 9, 2018, 5 pages.
European Patent Office "Office Action," issued in connection with European Patent Application No. 11006705.5, dated Mar. 14, 2019 (4 pages).
Canadian Intellectual Property Office, "Office Action," issued in connection with application No. 2,749,013, dated Aug. 1, 2016, 5 pages.
Canadian Intellectual Property Office, "Office Action," issued in connection with application No. 2,749,013, dated Jun. 17, 2019, 4 pages.
United States Patent and Trademark Office, "Non-Final Office Action," issued in connection with U.S. Appl. No. 14/537,488, dated Apr. 8, 2016, 14 pages.
United States Patent and Trademark Office, "Final Office Action," issued in connection with U.S. Appl. No. 14/537,488, dated Oct. 21, 2016, 18 pages.
United States Patent and Trademark Office, "Pre-Brief Appeal Conference Decision", issued in connection with U.S. Appl. No. 14/537,488, filed Jun. 7, 2017, (2 pages).
United States Patent and Trademark Office, "Non-Final Office Action," issued in connection with U.S. Appl. No. 14/537,488, dated Jun. 30, 2017, 18 pages.
United States Patent and Trademark Office, "Final Office Action," issued in connection with U.S. Appl. No. 14/537,488, dated Jan. 19, 2018, 19 pages.

(56) References Cited

OTHER PUBLICATIONS

United States Patent and Trademark Office, "Advisory Action," issued in connection with U.S. Appl. No. 14/537,488, dated Apr. 19, 2018, 4 pages.
United States Patent and Trademark Office, "Non-Final Office Action," issued in connection with U.S. Appl. No. 14/537,488, dated Jun. 28, 2018, 21 pages.
United States Patent and Trademark Office, "Notice of Allowance", issued in connection with U.S. Appl. No. 14/537,488, dated Jan. 23, 2019, (8 pages).
United States Patent and Trademark Office, "Corrected Notice of Allowance", issued in connection with U.S. Appl. No. 14/537,488, dated Feb. 28, 2019, (2 pages).
European Patent Office, "Extended European Search Report", issued in connection with EP patent application No. 20196396.4, dated Dec. 18, 2020 (11 pages).
United States Patent and Trademark Office, "Non-Final Office Action", issued in connection with U.S. Appl. No. 16/511,780, dated Jan. 29, 2021, (14 pages).

```
<?xml version="1.0" encoding="UTF-8"?>
<plist version="1.0">
<dict>
 <key>PayloadContent</key>
 <array>
  <dict>
   <key>PayloadContent</key>
   <array>
    <dict>
     <key>DefaultsData</key>
     <dict>
      <key>apns</key>
      <array>
       <dict>
        <key>apn</key>        <string>wap.cellular</string>
        <key>proxy</key>      <string>192.168.1.101</string>
        <key>proxyPort</key><integer>49152</integer>
        <key>username</key>   <string>WAP@CINGULARGPRS.COM</string>
       </dict>
      </array>
     </dict>
     <key>DefaultsDomainName</key><string>com.apple.managedCarrier</string>
    </dict>
   </array>
   <key>PayloadDescription</key>  <string>Carrier Access Point name.</string>
   <key>PayloadDisplayName</key>  <string>Advanced</string>
   <key>PayloadIdentifier</key>   <string>apn</string>
   <key>PayloadOrganization</key> <string>Example Organization</string>
   <key>PayloadType</key>         <string>com.apn.managed</string>
   <key>PayloadUUID</key>         <string>69AD0391-EF79-4537-ABCD-0987654321</string>
   <key>PayloadVersion</key>      <integer>1</integer>
  </dict>
 </array>
 <key>PayloadDescription</key>     <string>Proxy for internet
                                           traffic on mobile device.</string>
 <key>PayloadDisplayName</key>     <string>Example Configuration</string>
 <key>PayloadOrganization</key>    <string>Example Organization</string>
 <key>PayloadRemovalDisallowed</key><false/>
 <key>PayloadType</key>            <string>Configuration</string>
 <key>PayloadUUID</key>            <string>69AD0391-EF79-4537-ABCD-1234567890</string>
 <key>PayloadVersion</key>         <integer>1</integer>
</dict>
</plist>
```

FIG. 6

SYSTEMS, METHODS, AND APPARATUS TO MONITOR MOBILE INTERNET ACTIVITY

RELATED APPLICATION

This patent arises from a continuation of U.S. patent application Ser. No. 14/537,488, which was filed on Nov. 10, 2014, and issued on Jun. 11, 2019, as U.S. Pat. No. 10,320, 925, which is a continuation of U.S. patent application Ser. No. 12/856,651, which was filed on Aug. 14, 2010, and issued on Nov. 11, 2014, as U.S. Pat. No. 8,886,773. U.S. patent application Ser. No. 14/537,488 and U.S. patent application Ser. No. 12/856,651 are hereby incorporated herein by reference in their entireties.

FIELD OF THE DISCLOSURE

This disclosure relates generally to monitoring Internet activity and, more particularly, to systems, methods, and apparatus to monitor mobile Internet activity.

BACKGROUND

In recent years, methods of accessing Internet content have evolved. For example, Internet content was formerly primarily accessed via computer systems such as desktop and laptop computers. Recently, handheld mobile devices (e.g., smartphones) have been introduced that allow users to request and view Internet content. Typically, but not always, mobile devices request and receive Internet content via a wireless access network such as a cellular network.

BRIEF DESCRIPTION OF THE DRAWINGS

FIG. 6 illustrates an example configuration file that may be generated by the example registrar of FIG. 1.

DETAILED DESCRIPTION

Mobile monitoring companies desire to gain knowledge on how users interact with their handheld mobile devices such as smartphones. In particular, the mobile monitoring companies want to monitor Internet traffic to and/or from the handheld mobile devices to, among other things, monitor exposure to advertisements, determine advertisement effectiveness, determine user behavior, identify purchasing behavior associated with various demographics, etc. Some known systems have utilized a proxy server to monitor Internet content being transmitted to and from the monitored device.

Such known monitoring systems implemented the proxy server as an HTTP proxy that communicated with monitored handheld devices via a single port and required the monitored devices to provide authentication credentials including a username/device name and password that uniquely identified the mobile device involved in this Internet communication. These monitoring systems allowed mobile monitoring companies to associate Internet activity with the mobile device it originated from based on the username and password. Internet activity on handheld mobile devices is not limited to use of browsers (e.g., Apple® Safari®). For example, the Apple® iPhone® and the Apple® iPad™ support many third party applications (sometimes referred to as "Apps") accessing Internet content to perform a special function. For example, a weather application may request and display HTTP data from www.weather.com. These apps typically do not permit unrestricted browsing from website to website on the Internet (although they may permit movement within a defined set of webpages). Thus, apps typically provide access to a limited set of data on the Internet. In contrast, a browser enables a user to access virtually any publicly available site on the Internet (subject to restrictions such as content blockers) and directly shows the user the contents a website such as www.weather.com.

While some applications accessing Internet content properly respond to proxy requests to provide credentials, many applications, such as the weather application from the previous example, do not presently support proxy authentication and therefore fail to function if a proxy requests credentials. This can be frustrating for panelists and may cause the panelist to abandon participation in the monitoring panel. Furthermore, it is desirable for monitoring entities to monitor Internet activity without affecting the manner in which users behave. Causing application failure due to a monitoring technique is inconsistent with that desire.

Figure 1:
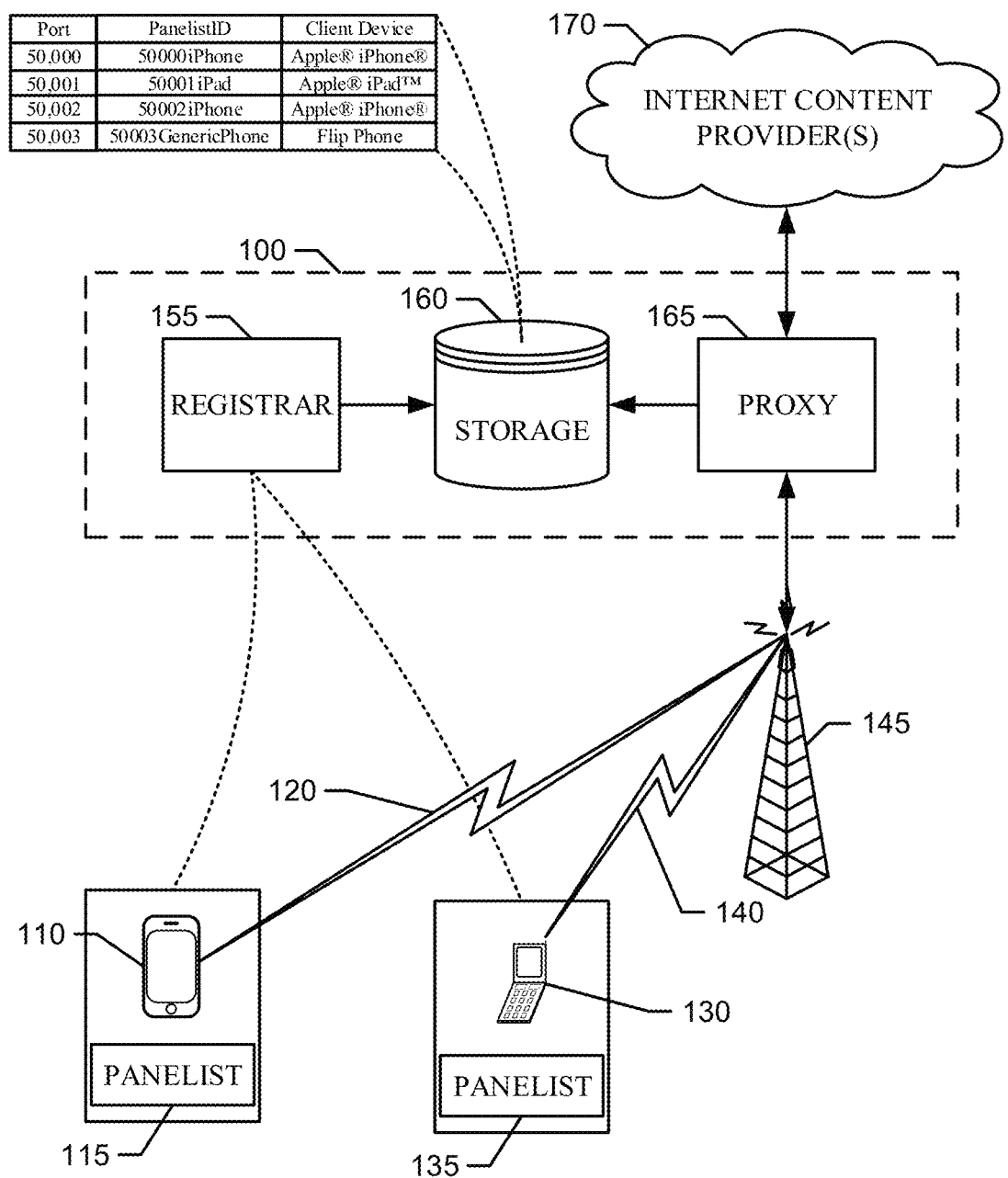
FIG. 1 is a block diagram of an example system to monitor mobile Internet activity.

To avoid errors inherent in using an authenticated proxy, the example system shown in FIG. 1 employs an un-authenticated proxy. Use of a proxy that does not request authentication credentials (i.e., an un-authenticated proxy), is problematic in that such an approach does not lend itself to user identification, and user identification is necessary to correlate activity behavior with demographics. The example system of FIG. 1 addresses this problem by hosting a unique un-authenticated port for each panelist and/or mobile device and instructing each monitored mobile device to communicate using its uniquely assigned port. This use of multiple ports allows the monitoring entity to uniquely associate the Internet traffic it detects with the panelist and/or mobile device involved in such traffic. While previous monitoring systems hosted a proxy connection on a single port such as port 8080, the proposed monitoring system hosts connections on many available ports (e.g., ports 0 to 65535). Certain ports are omitted from the list of available ports if those ports are associated with other Internet services. For example, ports 0 through 1023 are defined as Well Known Ports by the Internet Assigned Numbers Authority (IANA), and are prohibited from use without registration. Thus, Well Known Ports are not used in the example system of FIG. 1.

The example monitoring system of FIG. 1 records the identifications of data that the client devices request and/or receive and/or some or all of the data itself. Identifications of data and/or the data itself (e.g., web content) is collectively referred to herein as "session data." The session data is recorded in association with the panelist via the port number on which the session data is transmitted. From the recorded session data and the port number, the monitoring system can uniquely identify the site(s) that a particular panelist is visiting and how the panelist interacted with their mobile device, while avoiding interruption of services for the panelist.

FIG. 1 is a block diagram of an example system 100 to monitor mobile Internet activity. The example system monitors Internet traffic to and/or from handheld mobile devices (e.g., a first client device 110 associated with a first panelist 115, a second client device 130 associated with a second panelist 135). The monitored Internet traffic between the monitored devices (e.g., the client device 110, and the client device 130) and Internet sites (illustrating Internet content provider(s) 170) is routed to the example monitoring system 100. As shown in FIG. 1, the traffic passes through a wireless (e.g., cellular) communication system (e.g., an Internet service provider 145 and communicative links 120, 140). The example monitoring system 100 includes a registrar 155, a storage database 160, and a proxy 165.

The example first and second client devices 110, 130 of FIG. 1 are handheld mobile devices. While in the illustrated example the first client device 110 is shown as an Apple® iPhone® and the second client device 130 is shown as a flip phone, any other type of device may be used. For example, other types or phones, a laptop computer, a desktop computer, a personal digital assistant (PDA), a netbook, or a tablet computer (e.g., an Apple® iPad™) may additionally or alternatively be used. The first and second client devices 110, 130 may implement any mobile operating system, and may implement any type of hardware and/or form factor. In the illustrated example, the first and second client devices 110, 130 are mobile devices and communicate via the first and second wireless communication links 120, 140.

The first and second communication links 120, 140 of the illustrated example are cellular communication links. However, any other method and/or system of communication may additionally or alternatively be used such as, for example, an Ethernet connection, a Bluetooth connection, a WiFi connection, etc. Further, the example first and second communication links 120, 140 of FIG. 1 implement a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc. When alternative communication methods and/or systems are used (e.g., WiFi), the topology of the communication system may include a firewall that blocks Internet communications using certain ports. When the port uniquely assigned to a panelist is blocked by the firewall, the client device may fail to operate as expected and/or present error messages to the panelist.

The first and second panelists 115, 135 of the illustrated example are panelists participating in a monitoring service. Although the example system of FIG. 1 is a panelist-based system, non-panelist and/or hybrid panelist systems may alternatively be employed. In the panelist system of the illustrated example, demographic information is obtained from the user when the user joins and/or registers for the panel. The demographic information may be obtained from the user via a telephone interview, by having the user complete an online survey, etc. Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, the first and second panelists 115, 135 are associated with the first and second client devices 110, 130, respectively. In the illustrated example, the client devices 110, 130 are owned, leased, or otherwise belong to their respective panelists. The monitoring entity of the illustrated example does not provide the client devices. In other systems, panelists may be provided with client devices to participate in the panel. While in the illustrated example, the first and second client devices 110, 130 are each associated with a single panelist, the first and second client devices 110, 130 may alternatively be associated with more than one panelist. For example, a family may have a single client device that may be shared amongst multiple users. The sharing of a client device is less common when the client device is a cellular phone than when the client device is a portable computer (e.g., an Apple® iPad™).

The Internet service provider 145 of the illustrated example provides wireless Internet service to the first and second client devices 110, 130 via the communication links 120, 140. In the illustrated example, the wireless service is provided via a cellular connection. However, the Internet service provider 145 may provide Internet service via any other type of connection. Further, the Internet service provider 145 may implement the cellular connection via a Global System for Mobile Communications (GSM). However, any other systems and/or protocols for communications may be used. In practice, the Internet service provider 145 is sometimes referred to as a carrier, and provides a access to carrier network to the client devices.

In the illustrated example, the monitoring system 100 is shown as multiple computing systems. However, the monitoring system 100 may ultimately be comprised of a single computing system. In the illustrated example, the monitoring system 100 includes the registrar 155, the storage database 160, and the proxy 165. However, additional structures may be implemented to carry out one or more portions of the functionalities implemented by the registrar 155, the storage database 160, and/or the proxy 165, and/or other functions.

In the example of FIG. 1, the registrar 155 receives registration information from the panelists 115, 135 and stores a record identifying the panelist 115, 135 and/or their respective client devices 110, 130. In the illustrated example, the record identifying the panelist 115, 135 is the port number assigned to the panelist (e.g., the port assigned to the panelist may be 50,000 and the record identifying the panelist may be 50,000). In the illustrated example, the received registration information includes demographic information. However, any other information may additionally or alternatively be collected. The registration information may include, for example, information identifying the model of mobile device associated with the panelist, a mailing address associated with the panelist, an email address associated with the panelist, a phone number associated with the mobile device, a unique identifier of the panelist and/or mobile device (e.g., a social security number of the panelist, a phone number of the mobile device, a zip code of the panelist, and/or any combination or derivation of any information related to the panelist and/or mobile device), the age of the panelist, the gender of the panelist, the race of the panelist, the marital status of the panelist, the income of the panelist and/or the household of the panelist, the employment status of the panelist, where the panelist typically intend to use their device, how long the panelist has owned their device, the education level of the panelist and/or any other information related to the panelist or the mobile device.

In the illustrated example, the registration data is received by the registrar 155 via an electronic interface (e.g., by a panelist entering data into a form at a website or answering survey questions at a website). However, the registrar may receive the registration data may via other means. For example, the registrar may receive the registration data via a personal interview (by telephone or in person), a telephone interface, direct mailing, purchased lists, etc. While the registrar 155 of the illustrated example is an electronic system, the registrar 155 may alternatively be implemented manually by a person or group of people collecting and entering the registration data into the storage database 160.

Upon receiving the registration data, the registrar 155 of the illustrated example creates a record associating the panelist and a device identifier information with the collected demographic information. The registrar 155 may also assign a unique alphanumeric identifier to the panelist or device. The identifier may be based on, for example, a serial number of the client device. The record is stored in the storage database 160. In the illustrated example, the registrar 155 also assigns a unique port number to the panelist 115, 135 and/or the client device 110, 130 and stores the port number in the record (or in association with the record for that panelist and/or client device). As noted above, in addition to assigning and storing the port number, the registrar may assign and store additional identifiers. For example, the registrar may assign and store an identifier of the client device and/or the panelist. The panelist or client device identifier(s) may be the same as the port number, or they may be different from the port number.

In addition to assigning and storing the port number, the registrar 155 of the illustrated example generates a configuration document. In the illustrated example, the configuration document is an Extensible Markup Language (XML) file implementing a property list (referred to herein as a plist) file comprising configuration data such as the port number and an Internet proxy address to be used by the corresponding panelist and/or client device. However, any other type of document may be generated such as, for example, a comma separated (CSV) document, a Portable Document Format (PDF) document, a Microsoft® Word® document, etc. In the illustrated example, the configuration document is signed using a public/private key infrastructure. For example, the configuration document may be signed via a digital certificate. However, the configuration may alternatively not be signed. If the configuration document is not signed, it may appear as an invalid configuration file to the panelist, which may cause the panelist to abandon participation in the panel. The configuration file is sent to the corresponding client device (e.g., via an email message with the file attached or with a link to the file). The client device then interprets the data in the configuration file, thereby applying the data (e.g., the port number and Internet proxy address) to future communication of the mobile device. In the illustrated example the configuration file causes the mobile device to send all Internet traffic to the Internet address of the proxy 165 and to specify the unique port number assigned to the client device in such communication. As a result, all Internet communications to and/or from the mobile device are addressed to a uniquely assigned port of the proxy 165 and can, thus, be identified or associated with that particular client device. In the illustrated example the plist file is implemented for interpretation by an Apple® iPhone® and/or an Apple® iPad™. However, the mobile device may be any other type of mobile device. Further, the configuration file may be custom generated for the particular type of mobile device based on the model of the mobile device identified to (or by) the registrar as part of the registration data.

While in the example of FIG. 1, the document is an electronic document that may be interpreted by the client device to automatically configure the client device to communicate Internet related messages to a unique port of the proxy 165, the document may additionally or alternatively comprise an instruction document that may guide the panelist on how to configure the client device to communicate with the proxy. The instruction document may thereby instruct the panelist on how to apply the configuration file or may instruct the panelist on how to directly apply the data stored in the configuration file to the client device.

As noted above, the registrar 155 transmits the configuration document to the panelist and/or client device. In the illustrated example, the configuration file is provided via an electronic mail (email) message. The email message includes a hyperlink to download the configuration file to the client device. However, any other methods of transmitting the configuration file may additionally or alternatively be used. For example, the configuration file may be transmitted as an attachment to the email message, the registrar 155 may transmit a short message service (SMS) message comprising a link to or a textural representation of an Internet address where the client device may download the configuration file, a direct mailing may be sent to the panelist comprising the instruction document and/or additionally comprising an electronic medium containing the configuration file, a telephone call may be placed to orally instruct the panelist on how to configure the client device, etc.

The registrar 155 of FIG. 1 is implemented by a processor executing instructions, but it could alternatively be implemented by an ASIC, DSP, FPGA, or other circuitry. The storage database 160 receives and stores identifiers associating the panelists 115, 135 with the client devices 110, 130 from the registrar 155. Additionally, the storage database 160 receives and stores monitoring data from the proxy 165. The monitoring data is associated with the corresponding panelist and/or client device via the port number used for the corresponding monitored Internet traffic. The storage database 160 may also be capable of storing data that is not identifiers and/or measurement data. For example, updated software and/or updated firmware for any component of the monitoring system 100 may be stored in the storage database 160. Further, the storage database 160 may be capable of storing information that enables the registrar 155 to generate the configuration document. For example, the storage database 160 may store registration information such as the model of the client device 110, 130. Additionally, the storage database 160 may store demographic data as collected by the registrar 155.

The storage database 160 may be any device for storing data such as, for example, flash memory, magnetic media, optical media, etc. Furthermore, the data stored in the storage database 160 may be in any data format such as, for example, binary data, comma delimited data, tab delimited data, structured query language (SQL) structures, etc. While in the illustrated example the storage database is illustrated as a single database, the storage database 160 may be implemented by multiple databases.

The proxy 165 of the illustrated example receives requests from the client devices 110, 130 via the wireless Internet service provider 145. The requests of the client devices 110, 130 are received by the proxy 165 due to the configuration file having been applied to respective ones of the client device instructing the client device to transmit all subsequent requests through the proxy 165. The proxy 165 is located at the Internet proxy address identified in the configuration file, and receives request via ports associated with client devices. In the illustrated example, the ports are Dynamic and/or Private Ports as defined by the Internet Assigned Numbers Authority (IANA). Therefore, the range of assignable ports used by the illustrated proxy 165 for Internet traffic with monitored client devices is 49152 through 65535. By only using Dynamic and/or Private Ports, the group of panelists served by a single proxy 165 is effectively limited to 16383 client devices. This size can be expanded by using additional proxies at other Internet addresses. The additional proxies at other Internet addresses may be implemented by the same proxy 165 or by multiple proxies. For example, the proxy 165 may have multiple Internet addresses assigned to a network interface of the proxy 165 (e.g., virtual interfaces), or the proxy 165 may have multiple network interfaces each having an Internet address. While in the illustrated example only ports used within the Dynamic and/or Private Ports range are used, any other ports may additionally or alternatively be used. For example, ports within the Registered Ports range and/or the Well Known Ports range may potentially be used to increase the group of panelists to as large as 65535 panelists with a single proxy. In a scenario where a panel monitoring system such as the monitoring system 100 is being tested, a typically a panel will include at least sixty panelists and, thus, the proxy 165 will use at least sixty ports (e.g., one for each panelist). In a scenario where an ongoing panel is used, a panel size of at least 1,500 panelists may be used and, thus, the proxy 165 will use at least 1,500 ports (e.g., one for each panelist).

Upon receiving a request from a client device 110, 130, the proxy 165 retrieves the requested Internet content from the Internet content providers 170 (or from a local cache if, for example, it had previously been requested and stored). In order to identify the panelist associated with the request, communication to and from each specific panelist occurs over the uniquely assigned (e.g., dedicated) port. While the communication between a client device 110, 130 use the proxy 165 occurs over a single port (e.g., the port assigned to that client device 110, 130 by the registrar 155), communication between the proxy 165 and the Internet content providers 170 may be implemented over any port. Typically, the port used by the proxy to communicate with content providers 170 is limited to hypertext transfer protocol (HTTP) data that occurs over port 80. After retrieving the requested Internet content from the Internet content provider(s) 170, in the illustrated example the content is relayed to the requesting client device 110, 130 via the assigned port. Additionally or alternatively, the content may be relayed to the requesting client device 110, 130 via a port other than the assigned port (e.g., port 80).

The proxy 165 of the illustrated example stores the requests for Internet content and/or portion(s) of such requests originating from the client devices 110, 130 in the storage database 160 in association with the port numbers over which the request was received. In storing the requests, the proxy 165 may additionally store other identifiers such as, for example, the identifier of the client device 110, 130, and/or the identifier of the panelist 115, 135. Additionally or alternatively, the proxy 165 may store a portion of the Internet content in the storage database 160. For example, the proxy 165 may store the body of a webpage transmitted to the client device 110, 130. In another example, the proxy 165 may store an identifier of an advertisement appearing on the webpage transmitted to the client. This is particularly useful in situations where advertisements are rotated at websites. Additionally or alternatively, the proxy 165 may store characteristics of the response, such as, for example the HTTP header, a status code of the HTTP header, a content type of the HTTP header, etc.

The Internet content providers 170 supply content to clients via the Internet. In the illustrated example, the proxy 165 acts as an intermediary for the client devices 110, 130, and, thus, is the client of the Internet content providers 170. Internet content is often supplied over port 80, as most Internet content is in the form of HTTP data. However, any other port may be used to supply Internet content. For example, file transfer protocol (FTP) data may be transmitted over port 21, HTTP over Secure Socket Layer (SSL) may be transmitted over port 443, etc.

The Internet content providers 170 can be any provider. For example, the Internet content providers 170 may comprise a web server hosting webpages formatted as Hypertext Markup Language (HTML) content. Alternatively, the Internet content provider 170 may be an application server providing application content to applications accessing Internet content. The application content may be formatted as HTML, XML, or may use any other protocol or port to return content to the requester. In some examples, the application data is implemented in a protocol specifically targeted for an application requesting Internet content (e.g., as the weather application described above).

Figure 2:
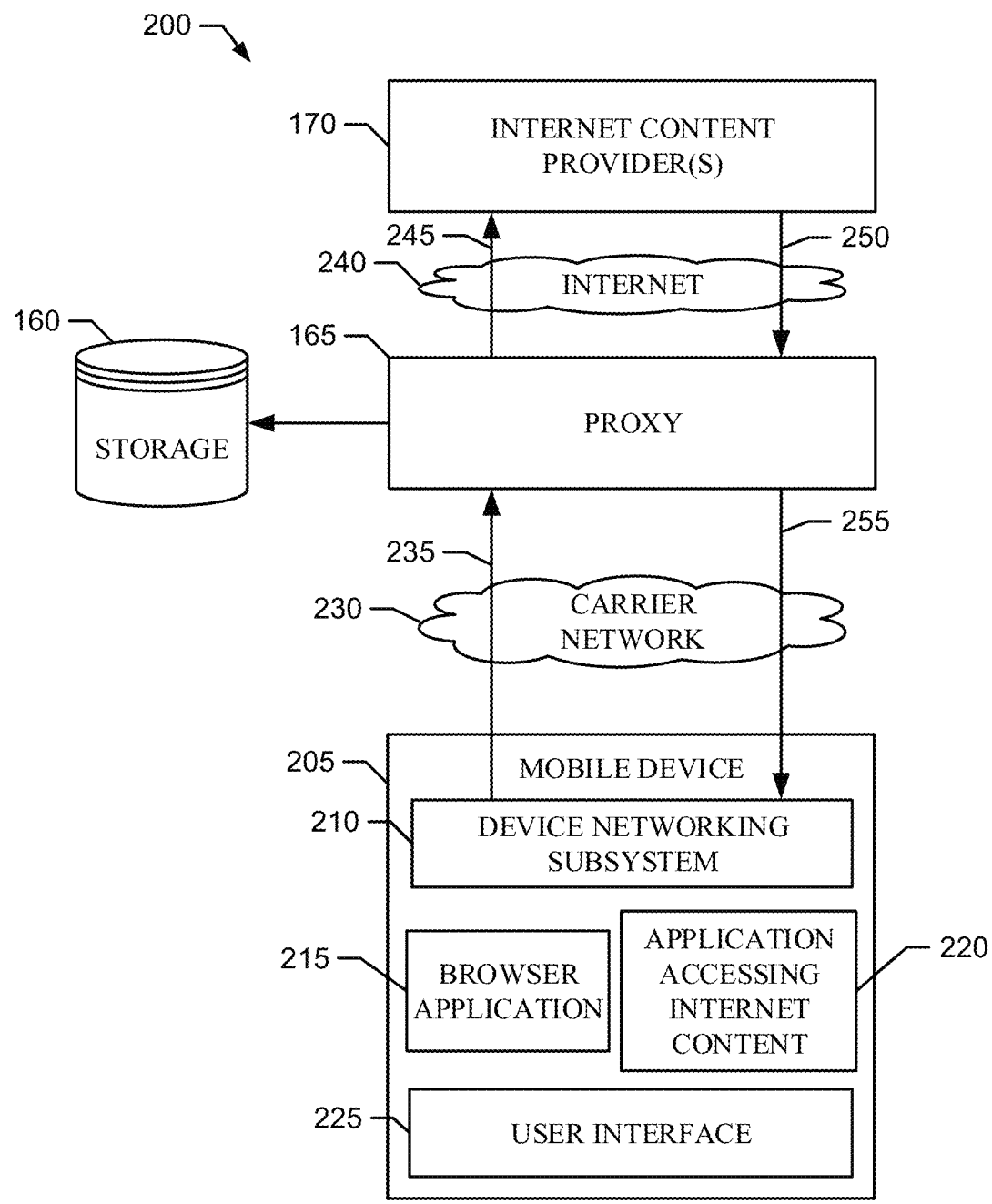
FIGS. 2 and 2A are a block diagrams illustrating an example request and response flow through the example system of FIG. 1.

FIG. 2 is a block diagram 200 illustrating an example request and response flow through the example system of FIG. 1. The block diagram 200 of FIG. 2 illustrates communication between a mobile device 205, a carrier network 230, the proxy 165, the storage database 160, the Internet 240, and the Internet content providers 170. The mobile device 205 represents either of the client devices 110, 130 and comprises a device networking subsystem 210, a browser application 215, an application accessing Internet content 220, and a user interface 225. Additionally, the block diagram illustrates a first request 235, a second request 245, a first response 250, and a second response 255.

The device networking subsystem 210 provides a framework for transmitting and receiving content. The device networking subsystem 210 may be implemented via an application processor, a software system that facilitates networked communication, a browser engine, a baseband processor that transmits network traffic, and/or any other system that provides a framework for transmitting and receiving content. In the illustrated example, the device networking subsystem is implemented by the networking libraries provided in the Apple® iPhone® operating system. However, any other libraries, systems, or programs may additionally or alternatively be used.

The browser application 215 and application accessing Internet content 220 are applications that are executed by a processor of the mobile device 205. The browser application 215 requests HTTP Internet content from Internet content providers 170, and renders the HTTP content for display. Additionally or alternatively, the browser application may request and render HTTPS Internet content. In some examples, the browser application is implemented by Apple® Safari®. However, any other application may alternatively be used. For example, Pocket Internet Explorer may be used. In some examples, the HTTP Internet content is HTML content. However, the content may be presented in any format that may be rendered by the browser application 215.

The application accessing Internet content 220 may be any application on the mobile device that requests Internet content. For example, the application accessing Internet content 220 may be a weather application accessing Internet content provided by www.weather.com. The Internet content provider 170 providing content for www.weather.com may respond to content requests with HTML data. However, any other type of data may be contained in the content request. For example, the Internet content provider 170 providing content for www.weather.com may provide an XML file containing a condensed weather forecast. Additionally or alternatively, the application accessing Internet content 220 may request media such as, for example, photos, video, audio, etc. Typically, applications accessing Internet content 220 are limited to a small amount of information to be displayed. For example, the weather application may not be able to display sports news. Although the browser 215 or the application accessing Internet content 220 may initiate requests for content, in some devices, such as the Apple® iPhone®, requests are formatted and transmitted by the device networking subsystem 210 based on system wide settings that control routing and/or addressing of such requests (e.g., to a specific port of a proxy 165).

The user interface 225 of the illustrated example provides a display to the user and receives input from the user. The user interface 225 may comprise hardware, a graphics library, and/or a graphics driver for displaying content to the panelist, and may comprise hardware, an input library, and/or an input driver for receiving input from the panelist. Either or both the browser application 215 and the application accessing Internet content 220 may utilize the user interface to display content and receive input.

The carrier network 230 is hosted by the Internet service provider 145. In the illustrated example, the carrier network 230 is an Internet Protocol (IP) version 4 (IPv4) based network. However, any other networking technology may additionally or alternatively be implemented. For example, the carrier network may 230 implement the IP version 6 (IPv6) protocol. Further, the carrier network 230 of the illustrated example is implemented using communication links 120, 140. While cellular connections are shown, any other method of communication may additionally or alternatively be used such as, for example, an Ethernet network, a WiFi network, etc. Additionally, the carrier network 230 is shown as a public network. However, the network may be a private network.

The proxy 165 receives a first request 235 for Internet content from the mobile device, retrieves the content by sending a second request 245 to the corresponding content provider 170, receive the content in a first response 250 from the content provider 170, and relays the content to the mobile device 205 via a second response 255. In the illustrated example, the proxy 165 stores characteristics and/or identifiers of the request and/or response in the storage database 160. These characteristics and/or identifiers may be, for example, a timestamp of the request and/or response, an IP address of the client, a user agent of the request, a status code of the response, a content type of the response, etc. However, the proxy 165 may additionally store the Internet content of the response in the storage database 160. In relaying the request, the proxy 165 translates the port of the requests, as is described below in conjunction with FIG. 2A.

The Internet 240 in the illustrated example is a public network. However, the a private network may instead be employed. For example, a network internal to an organization and/or company may be used to determine how members of the organization and/or employees of the company utilize internal web content via mobile devices.

Figure 2A:
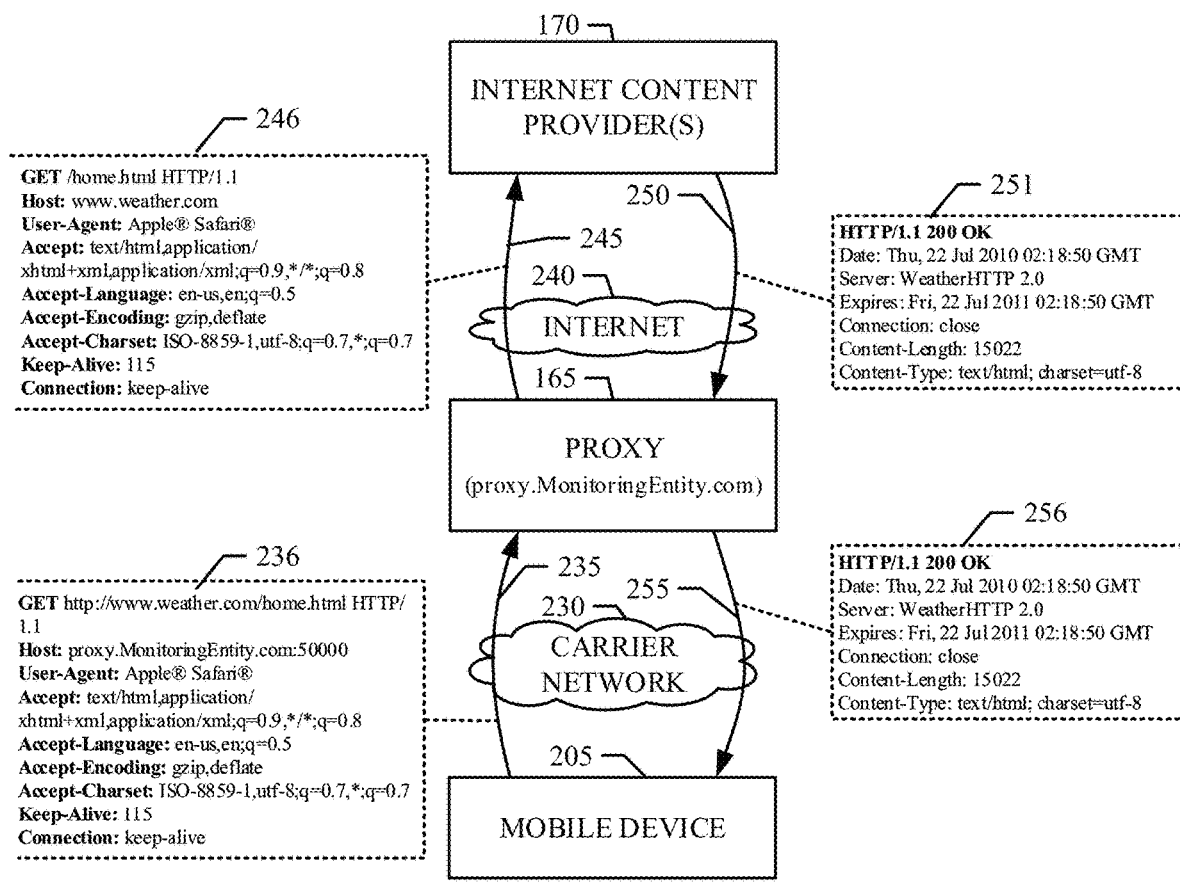

The illustrated example shows, a communication stream for a single request. The first request 235 is transmitted to the proxy 165 from the mobile device 205 over the carrier network 230. The first request 235 uses the unique port assigned to the mobile device 205 (e.g., port 50,000), and is for HTTP content (e.g., the request is for content that is served over port 80). However, the content requested may be requested over any port. For example, the request may be for file transfer protocol (FTP) content and may occur over port 21. The proxy 165, upon receiving the first request 235, stores some or all of the request in the storage database 160, and generates a second request 245. The second request 245 is effectively a translation of the first address as shown in FIG. 2A. The second request is addressed to the Internet content provider 170 identified in the first request 235. The second request 245 in the illustrated example is transmitted via the Internet 240 over port 80, as the first request 235 identified content to be served over port 80. The Internet content provider 170 responds to the second request 245 with the first response 250. The proxy 165 receives the first response 250 via port 80, stores some or all of the request in the storage database 160, and forwards the content of the first response 250 as the second response 255 to the mobile device 205 over the port assigned to the mobile device 205.

FIG. 2A is a block diagram 201 illustrating an example request and response flow through the example system of FIG. 1. The block diagram 201 includes the proxy 165, the Internet content provider(s) 170, the mobile device 205, the carrier network 230, and the Internet 240. The block diagram 201 additionally includes the first request 235, the second request 245, the first response 250, and the second response 255. Further, the requests and responses of the illustrated example are represented by HTTP request and response headers. The first request 235 is represented by the first HTTP request header 236 and the second request 245 is represented by the second HTTP request header 246. The first response 250 is represented by the first HTTP response header 251 and the second response 255 is represented by the second HTTP response header 256.

The first HTTP request header 236 is the header of a GET request generated by the mobile device 205. In the illustrated example, the Internet content provider 170 is identified by the absolute Uniform Resource Locator (URL) identified in the first line of the first HTTP request header 236 and the address of the proxy 165 and uniquely assigned port are identified by the "Host" line of the first HTTP request header 236. The host identified in the illustrated example is proxy.MonitoringEntity.com, and the port that the request was made on is 50,000. However, any other address identifying the proxy 165, and any other port may alternatively be used. For example, the address identifying the proxy 165 may be the Internet Protocol (IP) address of the proxy 165. In the illustrated example, the absolute URL of the Internet resource is "http://www.weather.com/home.html". However, any other URL may additionally or alternatively be used.

The proxy 165 receives the first content request 235 and generates the second content request 245. The second content request 245 is represented by the second HTTP request header 246. In the illustrated example, the second HTTP request header 246 is a GET request directed to "http://www.weather.com", and is transmitted over port 80 as no port other than port 80 is identified. The content being requested from "http://www.weather.com" in the illustrated example is "/home.html". The proxy generates the contents of the second request by inspecting the first request 235. For example, the proxy 165 identifies the requested content of the first request 235 as "http://www.weather.com/home.html", determines that the port to be translated to is port 80 (identified by http://), determines that the Internet content provider 170 identified is "www.weather.com", and determines that the requested webpage from the Internet content provider is "/home.html". The second content request 245 is transmitted over port 80 because the proxy 165 determines that the requested content is HTTP content, and no alternative port number is specified. Alternatively, the content identified by the first content request 235 may be content that is provided on a port other than port 80. In that example, the absolute URL of the first HTTP request header 236 would identify the requested content as "http://www.weather.com:1234/home.html", to convey that the content identified by the request is provided on port 1234. Further, the proxy 165 would generate the second HTTP request header 246 and include port 1234 in the identified host (e.g., www.weather.com:1234).

The Internet content providers 170 receive the second content request 245, and respond to the request via the first response 250. The first response 250 is transmitted to the proxy 165. In the illustrated example, the first response is transmitted over port 80, as it is a response to a content request made on port 80. However, any other port may be used to transmit the first response to the proxy 165. The proxy 165 receives the first response 250, and determines the correct port that the second response 255 should be transmitted over. In the illustrated example, the proxy 165 determines the port that the second response should be transmitted over by associating the first response 250 with the first request 235 via the second request 245. In such an example, the proxy 165 can identify that the first request 235 originated on port 50,000, and thus, the second response should be transmitted on port 50,000. However, any other method of determining the port to transmit the second response over may additionally or alternatively be used. Further, the response may be transmitted over a port other than the port assigned to the mobile device 205.

Figure 3:
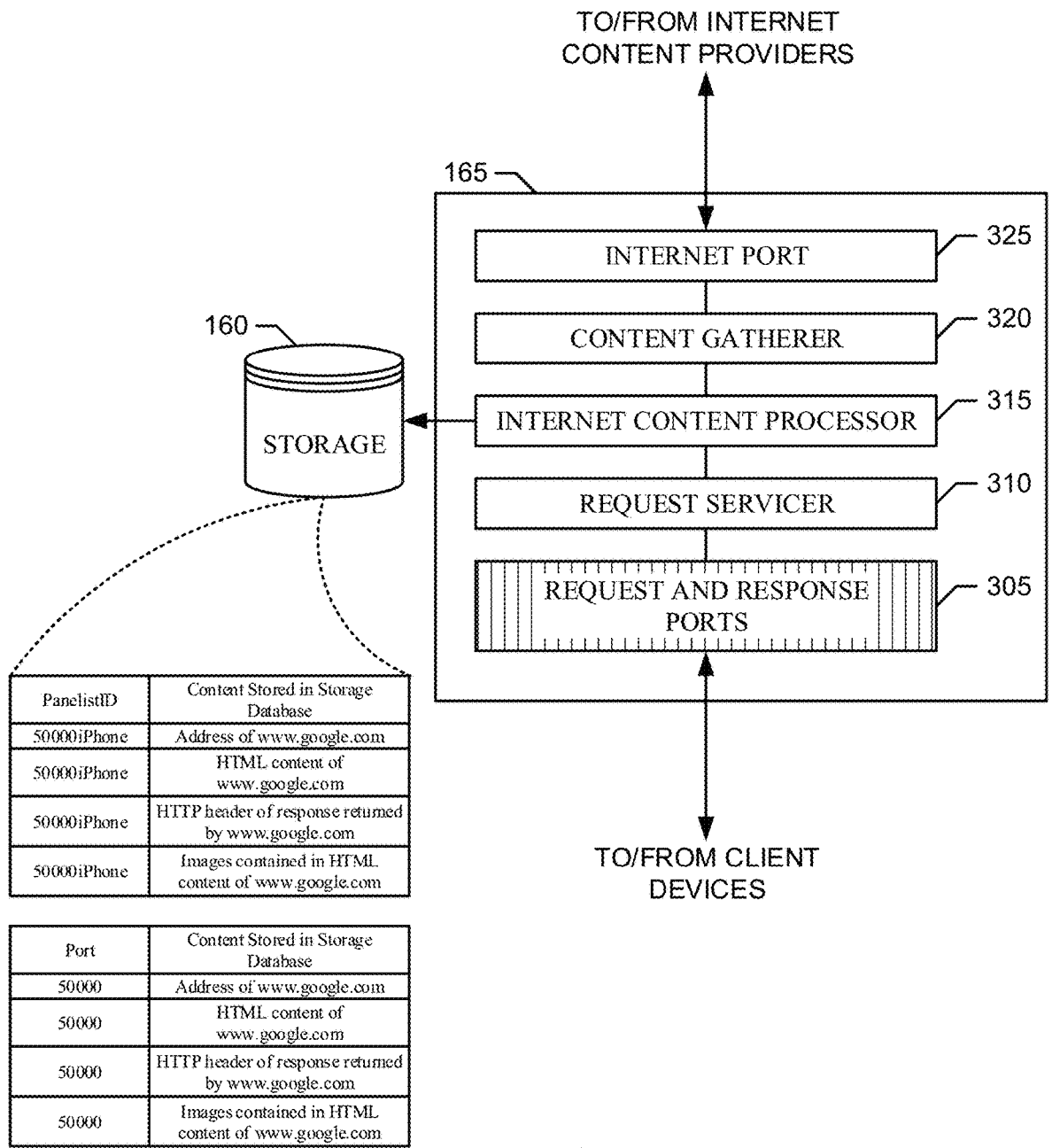
FIG. 3 is a block diagram of the example proxy of FIG. 1.

FIG. 3 is a block diagram of the example proxy 165 of FIG. 1. The example proxy 165 includes request and response ports 305, a request servicer 310, an Internet content processor 315, a content gatherer 320, and an Internet port 325. The request and response ports 305 receive requests and transmit responses to and/or from the client devices 110, 130. The requests received by the ports 305 are passed to the request servicer 310. The content gatherer 320 transmits requests and receives responses from the Internet content providers 170 via the Internet port 325. The Internet content processor 315 stores the requests (or portions thereof) and/or the retrieved content (or portions thereof or identifiers associated therewith) in the storage database 160.

The request and response ports 305 of the illustrated example are Transmission Control Protocol (TCP) ports and/or User Datagram Protocol (UDP) ports. However, any other port-based system may additionally or alternatively be used. The request and response ports of the illustrated example are Dynamic and/or Private Ports as defined by IANA. As such, the ports 305 range from port 49152 to port 65535, inclusive. However, the ports may use only some of this range (and the used portions may or may not be contiguous) and/or the ports may include ports in any other range such as, for example, Well Defined Ports (ranging from port 0 to port 1023) and/or Registered Ports (ranging from port 1024 to port 49151).

The request servicer 310 of the illustrated example receives the requests from the request and response ports 305 and performs a port translation. A port translation may not be necessary in the event that the proxy is hosted via the same port that the requested content is hosted on. For example, if the proxy is hosted on port 80 and the content request is for content provided on port 80 (e.g., HTTP content), no port translation would occur. First, the request is inspected to determine the destination port that is intended for communication with the Internet content provider 170. For example, in many situations, the request will be for HTTP content and the destination port will be identified as port 80. However, any other destination port may be employed. For example, FTP traffic may be translated to port 21. The content gatherer 320 is responsible for gathering the content identified in the request (e.g., by sending translated requests to the corresponding content provider). Once the content is gathered, the request servicer 310 performs another port translation on the received content response to generate a translated response and to send the translated response to the client device over the port assigned to the client device that made the request.

The Internet content processor 315 of the illustrated example determines the port (e.g., port 50,000) that the request was received on, and stores the request in the storage database 160 in association with the port to uniquely identify the client device. Additionally or alternatively, the Internet content processor 315 may use the port number to determine and store the panelist ID and/or the client device ID that was generated by the registrar 155 upon registration. In the illustrated example, the Internet content processor 315 stores the request for content. However, the Internet content processor 315 may store less than the entire request, a symbol for the request, etc., as shown in the tables of FIG. 3. Additionally or alternatively, the Internet content processor 315 may store the content provided in the response and/or segments and/or portions of the content provided in the response in the storage database 160. For example, the Internet content processor 315 may store advertisements transmitted to the client device in the storage database 160.

The content gatherer 320 of the illustrated example requests the content identified by the request for Internet content. In particular, the content gatherer 320 utilizes the Internet address of the content requested in the request via one of the ports 305 to generate a second request to gather the requested Internet content. The content gatherer 320 transmits the second request via the Internet port 325. The Internet port 325 of the illustrated example is a Transmission Control Protocol (TCP) port and/or a User Datagram Protocol (UDP) port. However, any other port-based system may additionally or alternatively be used. The Internet port of the illustrated example is for HTTP traffic (e.g., port 80). However, any other port may be used. For example, port 21 could be used for File Transfer Protocol (FTP) traffic.

While an example manner of implementing the proxy 165 of FIG. 1 has been illustrated in FIGS. 1 and 3, one or more of the elements, processes, and/or devices illustrated in FIG. 3 may be combined, divided, re-arranged, omitted, eliminated, and/or implemented in any other way. Further, the request and response ports 305, the request servicer 310, the Internet content processor 315, the content gatherer 320, the Internet port 325 and/or, more generally, the example proxy 165 of FIG. 3 and/or the example registrar 155 of FIG. 1 may be implemented by hardware, software, firmware, and/or any combination of hardware, software, and/or firmware. Thus, for example, any of the example request and response ports 305, the example request servicer 310, the example Internet content processor 315, the example content gatherer 320, the example Internet port 325 and/or, more generally, the example proxy 165 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example request and response ports 305, the example request servicer 310, the example Internet content processor 315, the example content gatherer 320, the example Internet port 325, the example proxy 165, the example registrar 155, and/or the storage database 160 are hereby expressly defined to include hardware and/or a computer readable medium such as a memory, DVD, CD, etc. storing the software and/or firmware. Further still, the example proxy 165 of FIGS. 1 and 3 may include one or more elements, processes, and/or devices in addition to, or instead of, those illustrated in FIG. 3, and/or may include more than one of any or all of the illustrated elements, processes, and devices.

Figure 4:
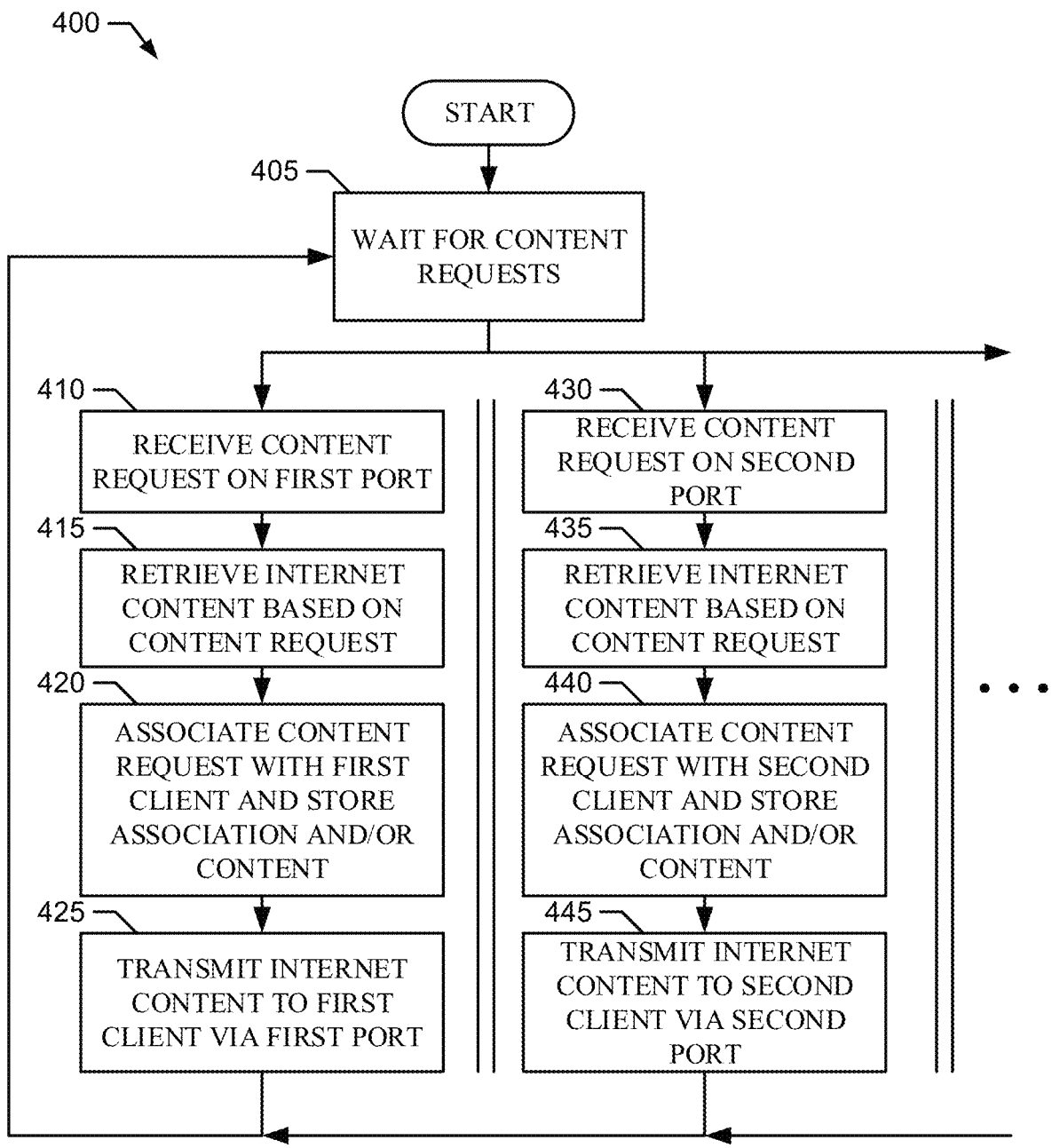
FIG. 4 is a flowchart representative of example machine-readable instructions that may be executed to implement the example proxy of FIGS. 1, 2, and 3.
Figure 5:
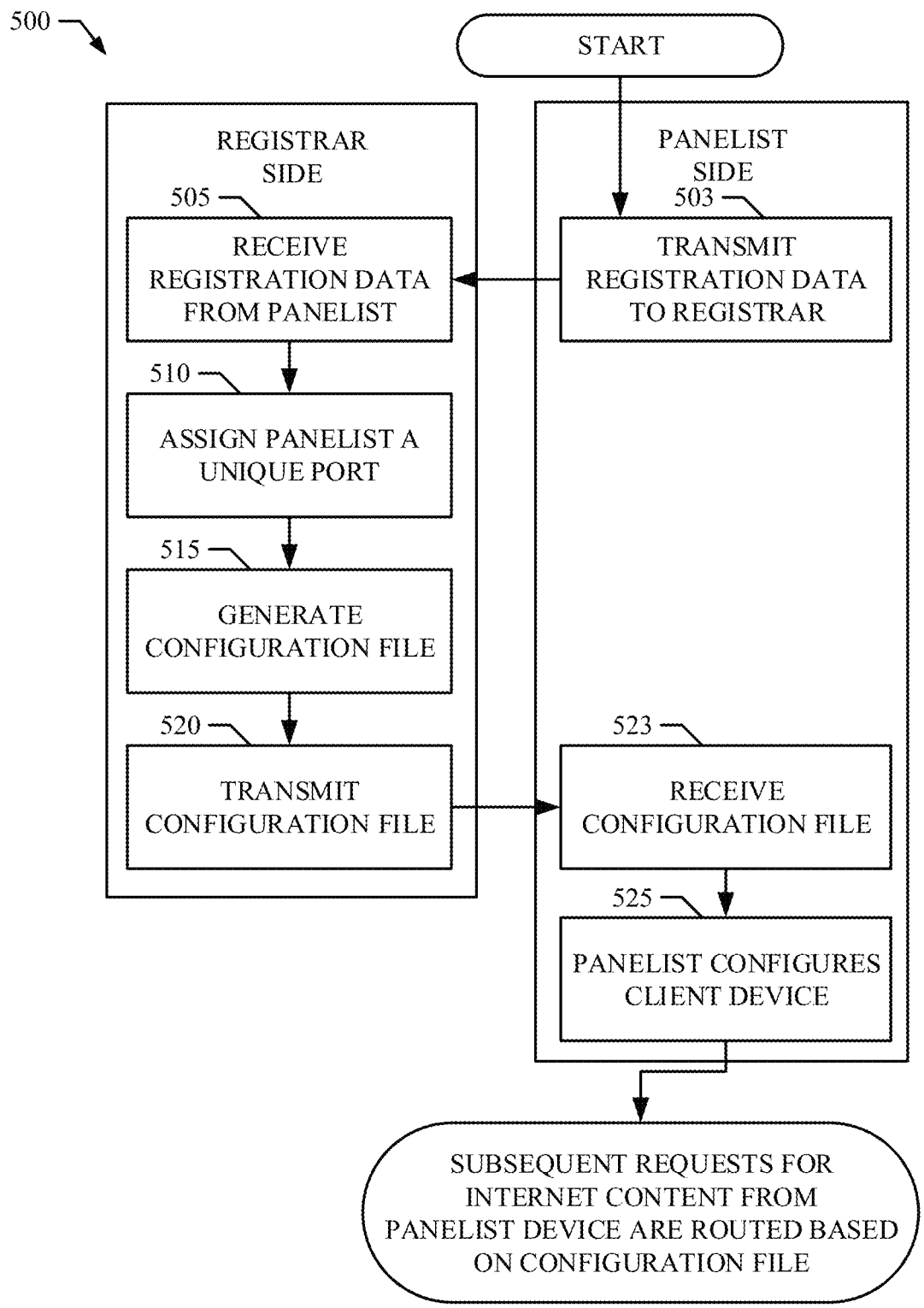
FIG. 5 is a flowchart representative of example machine-readable instructions that may be executed to implement the example registrar of FIG. 1.

A flowchart representative of example machine-readable instructions for implementing the proxy 165 of FIGS. 1 and/or 3 is shown in FIG. 4. Further, a flowchart representative of example machine-readable instructions for implementing the registrar 155 of FIG. 1 is shown in FIG. 5. In these examples, the machine-readable instructions comprise program(s) for execution by a processor such as the processor 712 shown in the example computer 700 discussed below in connection with FIG. 7. The program may be embodied in software stored on a computer readable medium such as a CD-ROM, a floppy disk, a hard drive, a digital versatile disk (DVD), or a memory associated with the processor 712, but the entire program(s) and/or parts thereof could alternatively be executed by a device other than the processor 712 and/or embodied in firmware or dedicated hardware. Further, although the example program(s) are described with reference to the flowcharts illustrated in FIGS. 4 and 5, many other methods of implementing the example proxy 165 and/or the example registrar 155 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer-readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer readable storage and to exclude propagating signals. Additionally or alternatively, the example processes of FIGS. 4 and 5 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

FIG. 4 is a flowchart representative of example machine-readable instructions 400 that may be executed to implement the example proxy of FIGS. 1, 2, and 3. The program of FIG. 4 begins at block 405, where the example machine-readable instructions 400 begin execution. First, the request servicer 310 of the proxy 165 waits for content requests (block 405). In the illustrated example, the request servicer 310 waits for content requests only on ports assigned to a client. However, the request servicer 310 may wait for content requests on any or all ports. Additionally, the request servicer 310 may inspect the Internet Protocol (IP) address against known range(s) of IP addresses to determine if the request should be serviced. For example, the known range of IP address may include ranges of IP addresses which are assigned to a particular Internet service provider and/or carrier. This may, for example, restrict use of the proxy 165 to mobile devices. If the request servicer 310 determines that the request did not originate from an IP address within the particular Internet service provider, the request servicer 310 may ignore the request.

Next, the request servicer 310 receives a content request on a port. Because multiple requests for content may be received at substantially the same time, the proxy 165 may receive a first content request on a first port (block 410) and a second content request on a second port (block 430). In the illustrated example, the content requests are processed in parallel to decrease the amount of time taken to respond to requests. However, the content requests may be processed in any other manner. For example, the content requests may be processed serially. The parallel processing of any number of requests is represented in FIG. 4 by these dots "•••".

Next, the content gatherer 320 generates second request(s) based on corresponding ones of the request received at blocks 410 and 430, to retrieve the Internet content identified in the corresponding content requests (blocks 415 and 435). The content gatherer 320 gathers the requested Internet content by sending the second requests via the Internet port 325. In the illustrated example, port 80 is used for sending requests. However, any other port may additionally or alternatively be used.

The Internet content processor 315 also associates the content requests with the corresponding requesting device and stores the association in the storage database (blocks 420 and 440). In the illustrated example, the Internet content processor 315 associates the first content request with the corresponding client device using the port number that the request was received upon. Since each port is used only by a single client device, each client device can be uniquely identified based on the port number of the port on which a request is received. Further, when storing the association in the storage database 160, the Internet content processor 315 may store one or more identifier(s) of the port, the client device, the panelist, etc. Additionally, the Internet content processor 315 may store the returned content or a portion of the returned content in the storage database 160 (block 420, 440).

The Internet content processor 315 may filter what is stored in the storage database. For example, the Internet content processor 315 may only store content requests that request HTTP content, as requests for non-HTTP content may not be parsed properly when analyzing the information. As another example, the Internet content processor 315 may omit style content (e.g., cascading style sheet (CSS) documents) from being stored in the storage database 160, as style content may be of limited use when analyzing the information.

The request servicer 310 finishes servicing the request from the client device by transmitting the requested Internet content to the client device via the port on which the content request was received (blocks 425 and 445). Control returns to the block 405, where the request servicer 310 waits for more content requests (block 405).

FIG. 5 is a flowchart representative of example machine-readable instructions 500 that may be executed to implement the example registrar 155 of FIG. 1. The example machine-readable instructions 500 of FIG. 5 begin execution at block 503, where the panelist 115, 135 submits registration data to the registrar 155 (block 503). In the illustrated example, the registration data is received by the registrar 155 (block 505) via an electronic interface (e.g., a website). However, the registrar may receive the registration data in any other way. For example, the registrar may receive the registration data via a telephone interface, direct mailings, predefined lists, etc.

Next, the registrar 155 assigns the panelist a unique port (block 510). In the illustrated example, the unique port is within the Dynamic and/or Private Port range as defined by IANA (e.g., port 49152 through 65535). However, any other port number in any other range may alternatively be used. In the illustrated example, because ports are assigned on a one panelist to one port basis, the port number functions as a unique identifier for the client device and/or the panelist.

The registrar 155 generates a configuration file (block 515). The configuration file includes the unique port assigned to the client device of the panelist, and an Internet proxy address. The Internet proxy address is the address of the proxy 165. The port number is a port of the proxy 165 and is uniquely associated with the panelist. In the illustrated example, the configuration document is an Extensible Markup Language (XML) file implementing a property list (plist) file comprising configuration data including the port number and the Internet proxy address. However, any other type of document may be generated such as, for example, a comma separated (CSV) document, a portable document format (PDF) document, a Microsoft® Word® document, etc. In the illustrated example, the configuration document is signed using a public/private key infrastructure. However, the configuration may alternatively not be signed. If the configuration document is not signed, it may appear as an invalid configuration file to the panelist, which may cause the panelist to abandon participation in the panel.

Next, the registrar 155 transmits the configuration file to the client device (block 520). In the illustrated example, the configuration file is transmitted via an electronic mail (email) message. The email message includes a hyperlink that may be selected to download the configuration file. However, any other methods of transmitting the configuration file may additionally or alternatively be used. For example, the configuration file may be transmitted as an attachment to the email message, the registrar 155 may transmit a short message service (SMS) message comprising an Internet address where the client device may download the configuration file, a direct mailing may be sent to the panelist comprising the instruction document and/or additionally comprising an electronic medium containing the configuration file, a telephone call may be placed to orally instruct the panelist on how to configure the client device, etc. The panelist and/or client device then receives the configuration file (block 523).

The client device 110, 130 is then configured via the configuration file (block 525). Since the configuration file is an electronic document that may be interpreted by the client device 110, 130, the client device receives the transmitted configuration file and automatically applies the settings contained in the document such that further Internet requests originating with the client are addressed to the corresponding port of the proxy 165. However, the configuration file may additionally or alternatively include an instruction document that may guide the panelist on how to configure the client device. The instruction document may thereby instruct the panelist on how to apply the configuration file or may instruct the panelist on how to manually apply the data in the configuration file.

Upon application of the data contained in the configuration file, subsequent requests for Internet content made by the client device 110, 130 are routed according to the configuration file. In particular, since the configuration file includes the Internet proxy address and the unique port number assigned to the client device, requests are proxied through the Internet proxy address via the unique port number.

FIG. 6 illustrates an example configuration file 600 that may be generated by the example registrar 155 of FIG. 1. The example configuration file 600 includes configuration data 605. The configuration data 605 include an Internet proxy address 610 and a unique port assignment 615.

The configuration file 600 is an Extensible Markup Language (XML) file implementing a property list (plist) file including configuration data such as the port number and the Internet proxy address of the proxy 165. However, any other type of document may be generated such as, for example, a comma separated (CSV) document, a portable document format (PDF) document, a Microsoft® Word® document, etc. The configuration file is implemented as a plist file in the illustrated example to facilitate support for an Apple® iPhone® as the mobile device. However, any other mobile device may additionally or alternatively be used, and the mobile device may implement any other operating system (e.g., Google® Android, Windows® Mobile®, etc.). For example, the configuration file may be formatted differently or may be in a different format to support interpretation by client devices implementing an operating system other than the operating system implemented by the Apple® iPhone®.

Figure 7:
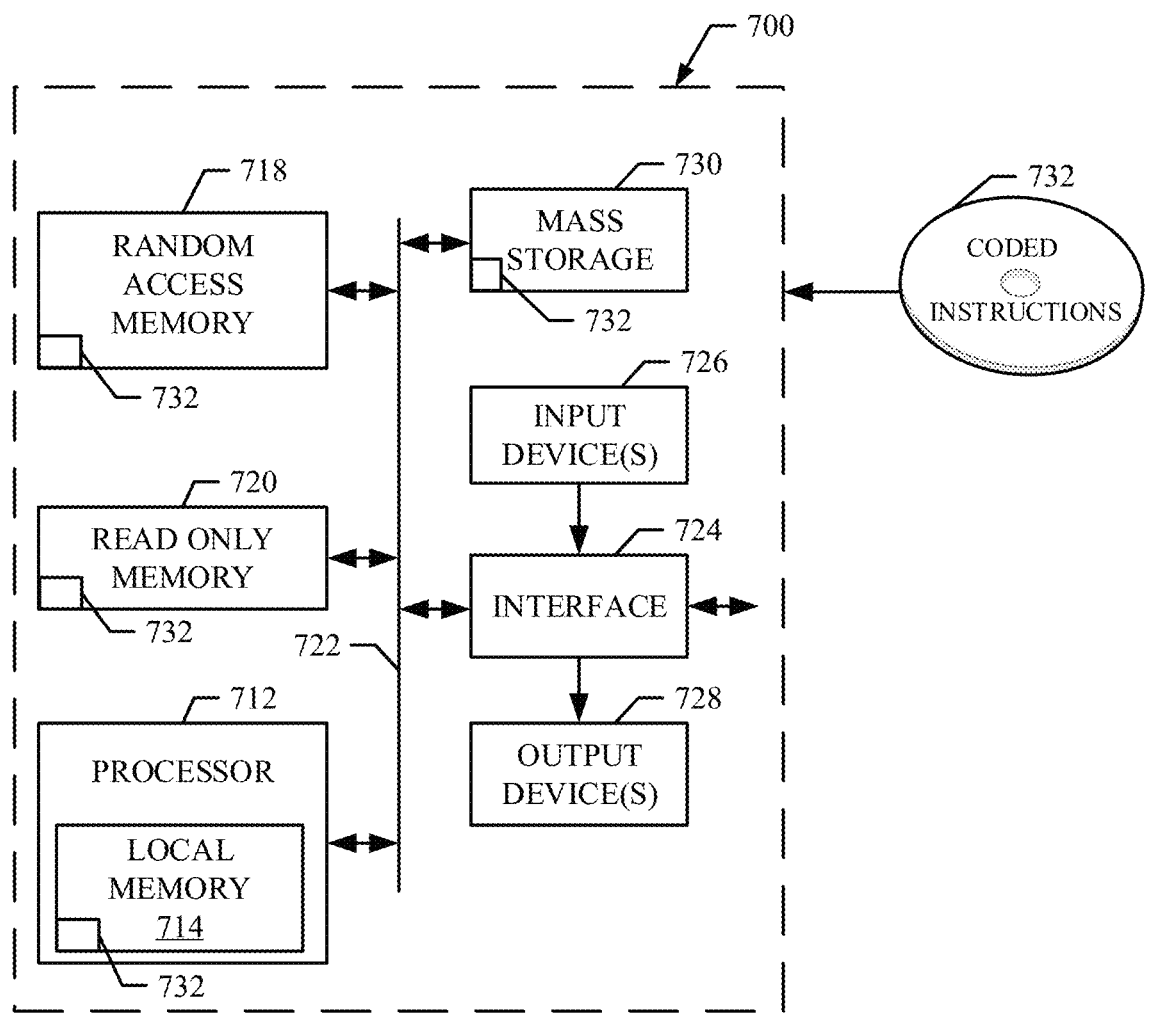
FIG. 7 is a block diagram of an example computer that may execute, for example, the machine-readable instructions of FIGS. 4 and/or 5 to implement the example monitor of FIGS. 1, 2, and 3, and/or the example registrar of FIG. 1.

FIG. 7 is a block diagram of an example computer 700 capable of executing the instructions of FIGS. 4 and 5 to implement the monitoring system of FIG. 1. The computer 700 can be, for example, a server, a personal computer, or any other type of computing device.

The system 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 714 is typically controlled by a memory controller (not shown).

The computer 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device (e.g., the request servicer 310) such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 730 for storing software and data. Examples of such mass storage devices 730 include floppy disk drives, hard drive disks, compact disk drives, and digital versatile disk (DVD) drives. The mass storage device 730 may implement the storage database 160.

The coded instructions 732 of FIGS. 4 and 5 may be stored in the mass storage device 730, in the volatile memory 718, in the non-volatile memory 720, in the local memory 714, and/or on a removable storage medium such as a CD or DVD.

From the foregoing, it will be appreciated that example methods, apparatus and articles of manufacture have been disclosed which allow Internet content requests made from mobile devices without requiring authorization credentials while still uniquely identifying the requesting device and/or panelist irrespective of whether the request originated with a browser or an application accessing Internet content.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:

1. A system to monitor media access by a mobile device, the system comprising:
    at least one processor; and
    memory including instructions that, when executed, cause the at least one processor to:
        in response to obtaining first panelist demographic information associated with a first panelist and second panelist demographic information associated with a second panelist, assign a first port of a proxy server to a first mobile device associated with the first panelist and a second port of the proxy server to a second mobile device associated with the second panelist, the first port different from the second port;
        transmit configuration information to the first mobile device to instruct the first mobile device to transmit requests for media including a first request to the first port; and
        in response to obtaining the first request at the first port, store an association between the first panelist demographic information and the media.

2. The system of claim 1, wherein the instructions, when executed, cause the at least one processor to service the first request by:
    transmitting the first request from a third port of the proxy server, the third port in communication with the Internet, the first port different from the third port, the first port not in communication with the Internet;
    receiving the media at the third port; and
    transmitting the media from the first port to the first mobile device.

3. The system of claim 1, wherein the association is a first association, and the instructions, when executed, cause the at least one processor to:
    register the first mobile device by storing a second association between the first mobile device, the first port, and the first panelist demographic information;
    in response to the first port receiving the first request, identify the first mobile device as having requested the media based on the second association;
    in response to a third port different from the first port obtaining the media, associate the first request with the first mobile device; and
    associate the first panelist demographic information with at least one of the media or the first request based on the first association.

4. The system of claim 1, wherein the instructions, when executed, cause the at least one processor to not service the first request if the first request originated from an Internet Protocol (IP) address outside of an IP address range known to originate media requests from mobile devices, the IP address range being a range of IP addresses that represents devices on a cellular network.

5. The system of claim 1, wherein the instructions, when executed, cause the at least one processor to obtain the first panelist demographic information and the second panelist demographic information during a panelist registration process, at least one of the first panelist demographic information or the second panelist demographic information including at least one of an employment status, a gender, a marital status, or a race.

6. The system of claim 1, wherein the first port functions as a unique identifier for at least one of the first mobile device or the first panelist, and the instructions, when executed, cause the at least one processor to only assign the first port to the first mobile device.

7. The system of claim 1, wherein the proxy server includes a plurality of ports including the first port and the second port, and the instructions, when executed, cause the at least one processor to assign a plurality of mobile devices including the first mobile device and the second mobile device on a one-to-one port basis, the first mobile device of the plurality of the mobile devices to only be assigned the first port.

8. A non-transitory computer readable storage medium comprising instructions that, when executed, cause at least one processor to:
    in response to obtaining first panelist demographic information associated with a first panelist and second panelist demographic information associated with a second panelist, assign a first port of a proxy server to a first mobile device associated with the first panelist and a second port of the proxy server to a second mobile device associated with the second panelist, the first port different from the second port;
    transmit configuration information to the first mobile device to instruct the first mobile device to transmit requests for media including a first request to the first port; and
    in response to obtaining the first request at the first port, store an association between the first panelist demographic information and the media.

9. The non-transitory computer readable storage medium of claim 8, wherein the instructions, when executed, cause the at least one processor to service the first request by:

transmitting the first request from a third port of the proxy server, the third port in communication with the Internet, the first port different from the third port, the first port not in communication with the Internet;

receiving the media at the third port; and transmitting the media from the first port to the first mobile device.

10. The non-transitory computer readable storage medium of claim 8, wherein the association is a first association, and the instructions, when executed, cause the at least one processor to:

register the first mobile device by storing a second association between the first mobile device, the first port, and the first panelist demographic information;

in response to the first port receiving the first request, identify the first mobile device as having requested the media based on the second association;

in response to a third port different from the first port obtaining the media, associate the first request with the first mobile device; and associate the first panelist demographic information with at least one of the media or the first request based on the first association.

11. The non-transitory computer readable storage medium of claim 8, wherein the instructions, when executed, cause the at least one processor to not service the first request if the first request originated from an Internet Protocol (IP) address outside of an IP address range known to originate media requests from mobile devices, the IP address range being a range of IP addresses that represents devices on a cellular network.

12. The non-transitory computer readable storage medium of claim 8, wherein the instructions, when executed, cause the at least one processor to obtain the first panelist demographic information and the second panelist demographic information during a panelist registration process, at least one of the first panelist demographic information or the second panelist demographic information including at least one of an employment status, a gender, a marital status, or a race.

13. The non-transitory computer readable storage medium of claim 8, wherein the first port functions as a unique identifier for at least one of the first mobile device or the first panelist, and the instructions, when executed, cause the at least one processor to only assign the first port to the first mobile device.

14. The non-transitory computer readable storage medium of claim 8, wherein the proxy server includes a plurality of ports including the first port and the second port, and the instructions, when executed, cause the at least one processor to assign a plurality of mobile devices including the first mobile device and the second mobile device on a one-to-one port basis, the first mobile device of the plurality of the mobile devices to only be assigned the first port.

15. An apparatus to monitor media access by a mobile device, the apparatus comprising:

means for obtaining, from a panelist during a panelist registration process, panelist demographic information identifying a demographic of the panelist;

means for assigning, in response to the obtaining of the panelist demographic information, a first port of a virtual interface of a proxy server to the mobile device associated with the panelist, the mobile device to transmit requests for media to the first port, the requests for media to identify the first port in a header of the requests;

means for transmitting configuration information to the mobile device, the configuration information to instruct the mobile device to transmit future requests for media to the first port;

means for identifying, in response to receiving a first request for media from the mobile device at the first port, the panelist identification information associated, by the assigning, with the first port receiving the first request for the media, the proxy server to service the first request by transmitting the first request from a second port of the proxy server and receiving the media at the second port, the second port in communication with the Internet, the first port different from the second port; and means for storing, monitoring data indicating the panelist having the demographic requested the media.

16. The apparatus of claim 15, wherein the means for transmitting is first means for transmitting, and further including second means for transmitting the requested media to the mobile device via the first port.

17. The apparatus of claim 15, wherein the means for storing is to store the first request for the media in a database.

18. The apparatus of claim 15, wherein the means for storing is to store the requested media in a database.

19. The apparatus of claim 15, further including means for servicing to not service the first request for the media from non-mobile devices if the first request originated from an Internet Protocol (IP) address outside of an IP address range known to originate media requests from mobile devices.

20. The apparatus of claim 19, wherein the IP address range is a range of IP addresses representing devices on a cellular network.

* * * * *